United States Patent
Koehn

(10) Patent No.: US 7,347,039 B2
(45) Date of Patent: Mar. 25, 2008

(54) FLIP-UP ARRANGEMENT FOR A MOWER DECK

(75) Inventor: LeRoy F. Koehn, Moundridge, KS (US)

(73) Assignee: Moridge Manufacturing, Inc., Moundridge, KS (US)

( * ) Notice: Subject to any disclaimer, the term of this patent is extended or adjusted under 35 U.S.C. 154(b) by 0 days.

(21) Appl. No.: 11/219,236

(22) Filed: Sep. 2, 2005

(65) Prior Publication Data

US 2006/0010846 A1 Jan. 19, 2006

Related U.S. Application Data

(63) Continuation-in-part of application No. 10/434,804, filed on May 9, 2003.

(51) Int. Cl.
*A01D 34/00* (2006.01)

(52) U.S. Cl. ..................... 56/15.9

(58) Field of Classification Search ........... 56/15.9, 56/15.2, 14.7, 15.1, 17.1, DIG. 22
See application file for complete search history.

(56) References Cited

U.S. PATENT DOCUMENTS

| | | | | |
|---|---|---|---|---|
| 3,087,296 | A | * | 4/1963 | Cowles ............... 56/10.7 |
| 3,698,164 | A | * | 10/1972 | Boone et al. ........... 56/10.4 |
| 4,136,508 | A | * | 1/1979 | Coleman et al. ........ 56/208 |
| 4,563,019 | A | | 1/1986 | Kuhn et al. |
| 4,660,654 | A | | 4/1987 | Wiebe et al. |
| 4,742,671 | A | | 5/1988 | Bich |
| 4,760,686 | A | | 8/1988 | Samejima et al. |
| 4,769,977 | A | * | 9/1988 | Milbourn .............. 56/15.2 |
| 4,779,406 | A | | 10/1988 | Schroeder |
| 4,829,754 | A | | 5/1989 | Shimamura et al. |
| 4,997,333 | A | | 3/1991 | Ball et al. |
| 5,069,022 | A | | 12/1991 | Vendermark |
| 5,079,907 | A | | 1/1992 | Sameshima et al. |
| 5,459,984 | A | | 10/1995 | Reichen et al. |
| 5,475,971 | A | | 12/1995 | Good et al. |
| 5,515,669 | A | | 5/1996 | Schick et al. |
| 5,528,886 | A | | 6/1996 | Esau |
| 5,816,035 | A | | 10/1998 | Schick |
| 5,927,055 | A | | 7/1999 | Ferree et al. |
| 6,347,503 | B1 | | 2/2002 | Esau et al. |
| 6,658,831 | B2 | | 12/2003 | Velke et al. |
| 2002/0194826 | A1 | * | 12/2002 | Schick et al. ........... 56/15.9 |

FOREIGN PATENT DOCUMENTS

GB 2199225 7/1988

* cited by examiner

*Primary Examiner*—Árpád Fábián Kovács
(74) *Attorney, Agent, or Firm*—Shook, Hardy & Bacon L.L.P.

(57) ABSTRACT

A mower deck is selectively coupled to the front of a propelling vehicle. The deck includes an electric mowing height adjustment assembly to permit the user to vary the cutting height of the mower deck. The deck is movable about a lift shaft from a generally horizontal use position to an upright storage/servicing position while the deck is coupled with the vehicle. An electric actuator and a switch mount of the mowing height adjustment assembly not only provide the user with a way to adjust the cutting height but also cooperate with the remainder of the mowing height adjustment assembly to allow movement of the deck from the use position to the storage/servicing position. Movement of the switch mount from a generally horizontal, engaged use position to a unengaged position permits the deck to be moved from the use position to the upright storage/servicing position.

8 Claims, 22 Drawing Sheets

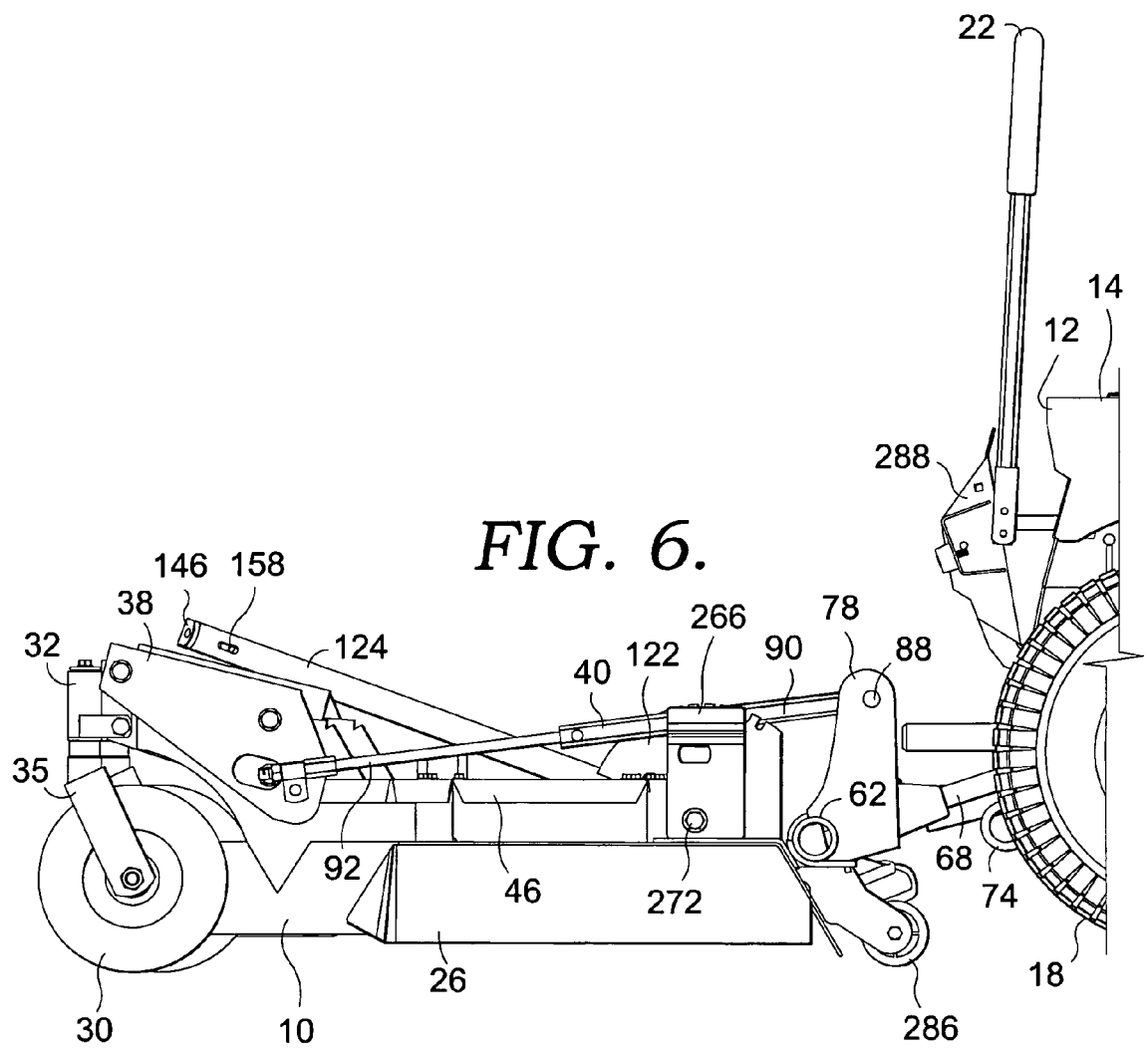

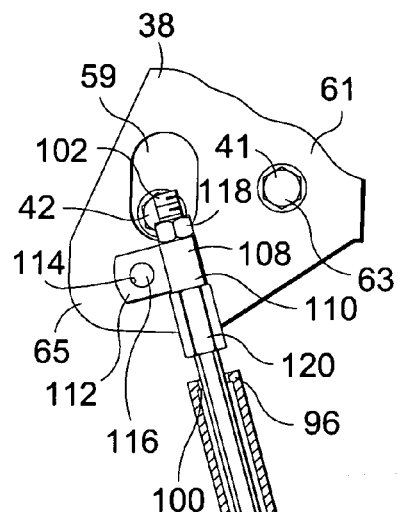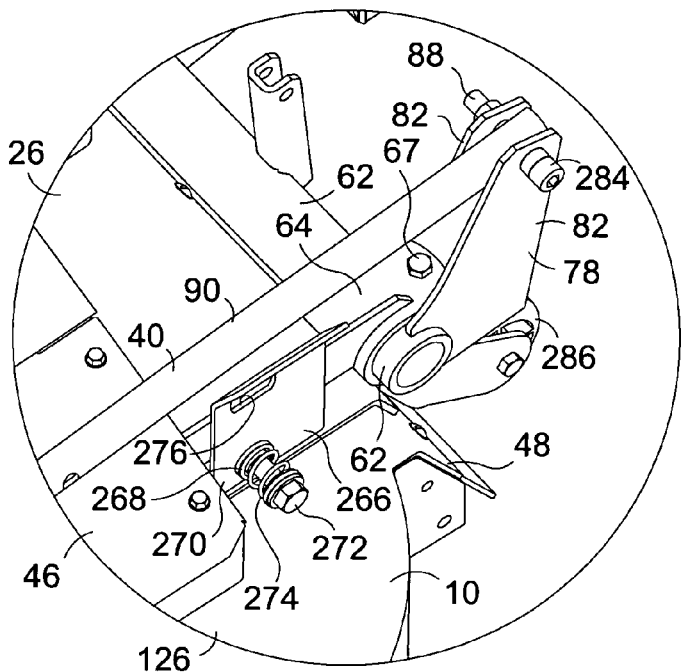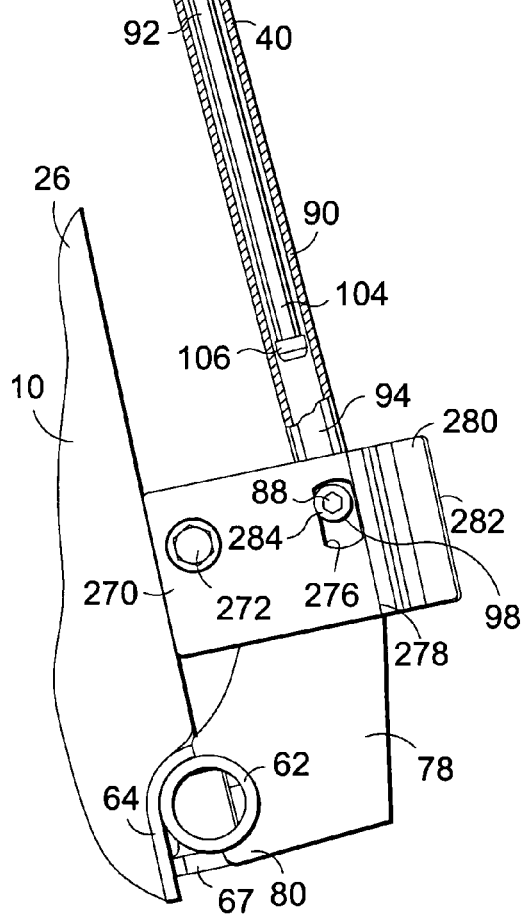
FIG. 16.
FIG. 17.

FLIP-UP ARRANGEMENT FOR A MOWER DECK

CROSS-REFERENCE TO RELATED APPLICATIONS

This application is a continuation-in-part of prior U.S. application Ser. No. 10/434,804, filed May 9, 2003, entitled "Flip-up Arrangement for a Mower Deck".

STATEMENT REGARDING FEDERALLY SPONSORED RESEARCH OR DEVELOPMENT

Not applicable.

BACKGROUND OF THE INVENTION

The present invention relates to a flip-up mower deck with an arrangement for positioning the mower deck between a use position and a storage/servicing position. More particularly, this invention relates to a mower deck having an improved construction which significantly reduces the number of steps required to switch the deck from the use position to the storage/servicing position.

Riding mowing vehicles for cutting grass or vegetation have become fairly commonplace in today's society. The vehicles have been designed to solve various problems and perform various tasks. One type of mowing vehicle that has become fairly common are those which have mowing decks attached to the front of the vehicle. By placing the mower deck forward of the forward most wheels of the vehicle, the operator of the vehicle can often get the deck closer to objects, such as trees, while mowing than if the deck was mounted behind the vehicle's front wheels. Additionally, by mounting the deck forward of the vehicle's front wheels, the amount of grass left uncut when a user turns around during mowing is often significantly reduced if not eliminated.

When a mower deck is mounted to the front of a vehicle, it is often desirable for the operator to be able to quickly and easily couple and uncouple the deck from the front of the vehicle. For example, the operator may wish to perform a task other than mowing and therefore need to place a different implement on the front of the vehicle, such as a snow blower. One extremely advantageous hitching arrangement is disclosed in U.S. Pat. No. 5,528,886 to Esau et al., which is herein incorporated by reference. This patent discloses a hitching arrangement between a mower deck and a propelling vehicle. This hitching arrangement readily permits an operator of the vehicle to quickly couple or uncouple the mower deck from the propelling vehicle. This patent discloses a hitching arrangement between a mower deck and propelling vehicle that includes a lift shaft rotatably supported by and extending transversely across the deck. It further discloses at least one hitch arm secured on one end to the lift shaft and having a hook with a downwardly facing opening on its other end for engagement with a generally horizontally disposed attaching member on the propelling vehicle. The deck includes a cutting height adjustment mechanism to permit the operator to vary the cutting height of the mower deck. The cutting height adjustment mechanism is also operably coupled to the lift shaft to permit the operator to rotate the lift shaft and thereby couple or uncouple the deck with the mowing vehicle by moving the hooks out of engagement with the horizontal attaching member.

While the hitching arrangement disclosed in U.S. Pat. No. 5,528,886 is highly advantageous, one of the drawbacks of the particular arrangement was its inability to provide the operator with ready and immediate access to the underneath side of the deck while the deck is coupled with the mowing vehicle. U.S. Pat. No. 6,347,503 to Esaw et al., however, disclosed a flip-up arrangement for a mower deck that overcame this narrow drawback, and is hereby incorporated herein by reference. This flip-up arrangement included a unique mechanism in the hitch arms that permitted the deck to be flipped up to a generally vertical position while still attached to the vehicle, thereby permitting ready access to the underneath of the mower deck. This not only allowed the operator to clean the underneath of the deck and have access to the blades to perform maintenance thereon, but provided a quick and practical way to reduce the overall length of the mowing vehicle for storage purposes.

While successful in overcoming some disadvantages of prior deck arrangements, the mower deck of U.S. Pat. No. 6,347,503 does have some drawbacks. In particular, the disclosed mower deck requires that a deck stand be coupled with a rear of the deck for mounting and dismounting the deck from the vehicle as well as to flip the deck up to its storage/servicing position. Other drawbacks include having to adjust the lift lever to install the deck stand and then again having to adjust the lift lever before the deck can be flipped up, having to disconnect the PTO drive shaft from the mower deck before the deck can be flipped up, and having to unlock the deck by moving levers prior to flipping the deck up.

Therefore, there is a need for a flip-up deck arrangement which does not require the attachment of items to the deck prior to being able to flip the deck up to the storage/servicing position. There is also a need for a flip-up deck arrangement that permits movement of the deck from a use position to a storage/service position without requiring uncoupling the deck from the power takeoff of the mowing vehicle. There is also a need for a flip-up deck arrangement which does not require the operator to perform numerous steps before being able to move the deck from its use position to its storage/servicing position. The present invention overcomes the drawbacks of the prior art and fills these and other needs.

SUMMARY OF THE INVENTION

In order to overcome the above stated problems and limitations, and to achieve the noted advantages, there is provided a flip-up deck arrangement for a mower that permits the deck to be moved from a use position to a storage/servicing position in a minimal number of steps performed by the vehicle operator. The deck includes a mowing height adjustment lever to permit the operator to vary the cutting height of the mower. The mowing height adjustment lever cooperates with a first latching member when the mower height adjustment lever is in an upright position to prevent movement of the deck from the use position to the storage/servicing position. When the mowing height adjustment lever is moved to a collapsed position, it is moved out of cooperation with the first latching member and thereby permits movement of the deck from the use position to the storage/servicing position.

The deck further includes a locking mechanism that automatically locks the deck in the storage/servicing position when the deck is moved from the use position to the storage/servicing position. The deck then stays in the storage/servicing position until the user deactivates the locking mechanism to thereby permit the deck to be returned to the use position.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWINGS

The features of the invention noted above are explained in more detail with reference to the embodiments illustrated in the attached drawing figures, in which like reference numerals denote like elements, in which FIGS. 1-28 illustrate an embodiment of the present invention and in which:

FIG. 1 is a rear perspective view of a mower having a deck of the present invention ready to be coupled with a propelling vehicle;

FIG. 2 is a side elevational view of a mower with a deck of the present invention in a use position;

FIG. 3 is a top perspective view of a mower with a deck of the present invention in a use position;

FIG. 4 is a front perspective view of a mower with a deck of the present invention in a use position;

FIG. 5 is a fragmentary view of the mower illustrated in FIG. 2 further illustrating a mower height adjustment lever movable from an upright position to a collapsed positioned illustrated in dash lines;

FIG. 6 is a view of the mower of FIG. 5 from the opposite side and illustrating the mower height adjustment lever in the collapsed position.

FIG. 7 is a side elevational view of a mower with the deck of the present invention in a storage/servicing position;

FIG. 8 is a front perspective view of a mower with the deck of the present invention in a storage/servicing position;

FIG. 9 is a fragmentary side elevational view of a mower with a deck of the present invention in the storage/servicing position illustrated from an opposite side of that depicted in FIG. 7;

FIG. 10 is an enlarged view of the area 10 in FIG. 3 further illustrating primary and secondary latch members of the deck;

FIG. 11 is a fragmentary side elevational view of a mowing height adjustment mechanism of the present invention including a mowing height adjustment lever and further illustrating its cooperation with first and second latching members to prevent movement of the deck from the use position to the storage/servicing position;

FIG. 12 is a view of the portion of the deck illustrated in FIG. 11 from an opposite side;

FIG. 13 is the view of FIG. 12 illustrating the secondary latch in an unlatched position;

FIG. 14 is the view of FIG. 13 illustrating the mower height adjustment lever in a collapsed position;

FIG. 15 is the view of FIG. 14 illustrating the relationship between the first latching member and an upper surface of the deck as the deck is moved from the use position to the storage/servicing position;

FIG. 16 is an enlarged view of the area 16 in FIG. 3 further illustrating an automatic latching assembly for retaining the deck in the storage/servicing position;

FIG. 17 is a fragmentary view of the deck of FIG. 9 illustrating a height adjustment linkage arm in a retracted position with a portion of the arm cut away;

FIG. 18 is a fragmentary front elevational view of the mowing height adjustment mechanism of FIG. 11 with portions of the deck omitted for clarity;

FIG. 19 is a fragmentary view of the deck of FIG. 4 with portions thereof omitted for clarity and illustrating one of the parallel linkage assemblies in an exploded view;

FIG. 20 is a rear perspective view of a mower having a deck of a second embodiment of the present invention ready to be coupled with a propelling vehicle;

FIG. 21 is a top perspective view of a mower with a deck of the second embodiment of the present invention in a use position;

FIG. 22 is a side elevational view of a mower with the deck of the second embodiment of the present invention in a storage/servicing position;

FIG. 23 is an enlarged, fragmentary, top perspective view of an indicator linkage of the second embodiment of the present invention;

FIG. 24 is enlarged, fragmentary, top perspective view of an electronic height adjustment assembly of the second embodiment of the present invention in a first position;

FIG. 25 is enlarged, fragmentary, top perspective view of the electronic height adjustment assembly of the second embodiment of the present invention in a second position;

FIG. 26 is enlarged, fragmentary, top perspective view of a switch mount of the electronic height adjustment assembly of the second embodiment of the present invention from an opposite side as in FIG. 24;

FIG. 27 is an exploded top perspective view of the deck of the second embodiment of the present invention; and FIG. 28 is an enlarged top perspective view of an actuator with portions of the actuator omitted for clarity.

DETAILED DESCRIPTION OF THE INVENTION

Figure 1:
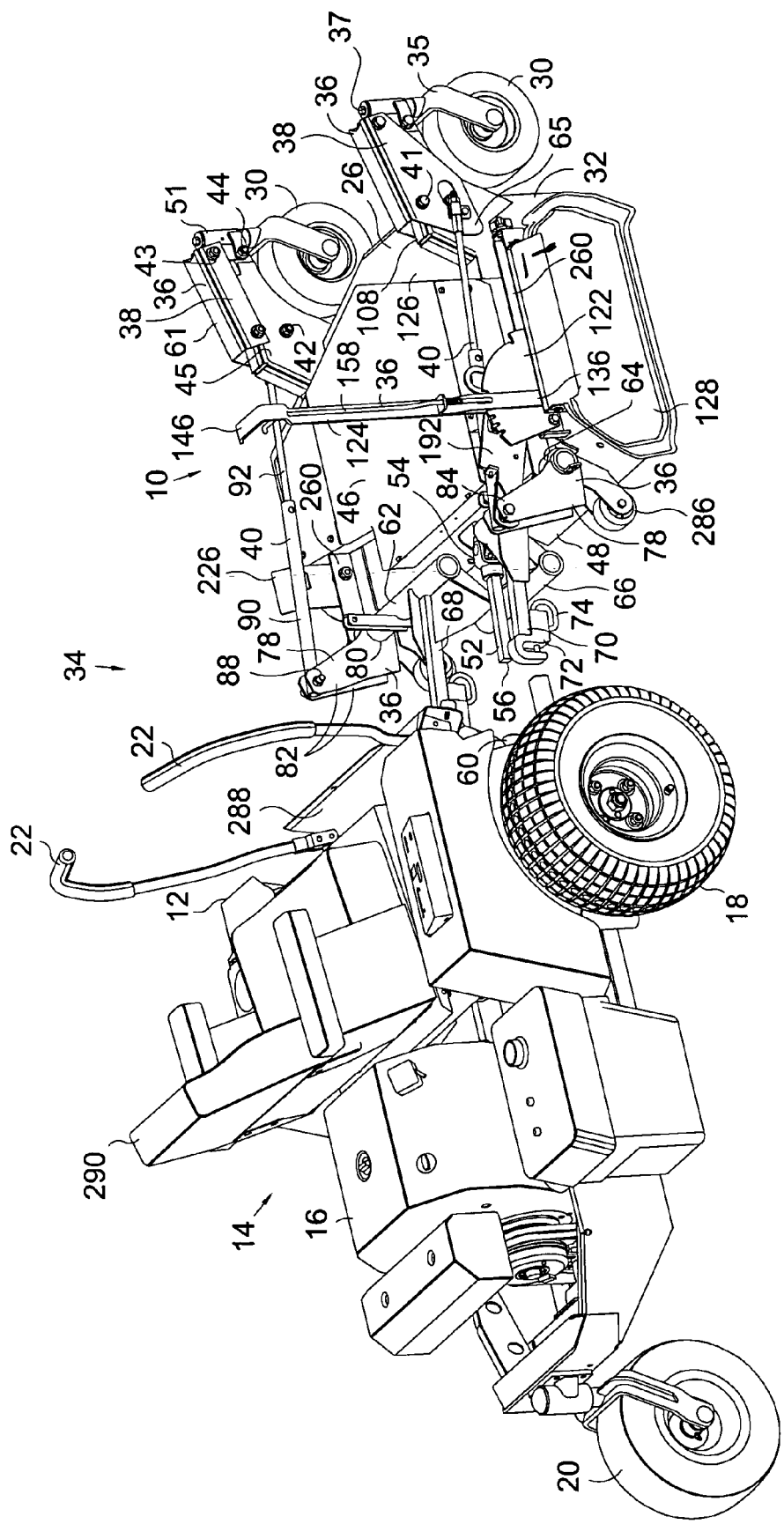

Referring now to the drawings in more detail and initially to FIG. 1, numeral 10 generally designates a mower deck having a flip-up arrangement, the mower deck constructed in accordance with the present invention. The mower deck 10 is selectively coupled to a front 12 of a propelling vehicle 14, such as a lawn tractor. The vehicle 14 includes a motor 16 which, as with most mowers with front mount decks, drives the front wheels 18 of the vehicle. The illustrated vehicle 14 includes a rear caster wheel 20 and is steered by control arms 22. Alternatively, the vehicle could have rear wheels which are controlled by a steering wheel. A power take off 24 (best seen in FIG. 4) is provided at the front 12 of the vehicle 14 to provide power to an attachment, in this case the mower deck 10, coupled to the front of the vehicle 14.

The deck includes a housing 26 that contains cutting blades 28 for cutting grass or vegetation. Caster wheels 30 are positioned at a front 32 of the deck 10 and support the front 32 of the deck 10 during operation of the mower 34 as they ride along the ground. The combination of the vehicle 14 and the mower deck 10 are often collectively referred to herein as a mower 34 for simplicity. The caster wheels have a fork 35 with a generally vertical shaft 37. The caster wheels 30 also cooperate with a mower height adjustment assembly 36 to permit the operator to adjust the cutting height of the mower 34 (i.e., the distance between the cutting blades 28 and the ground).

Figure 19:
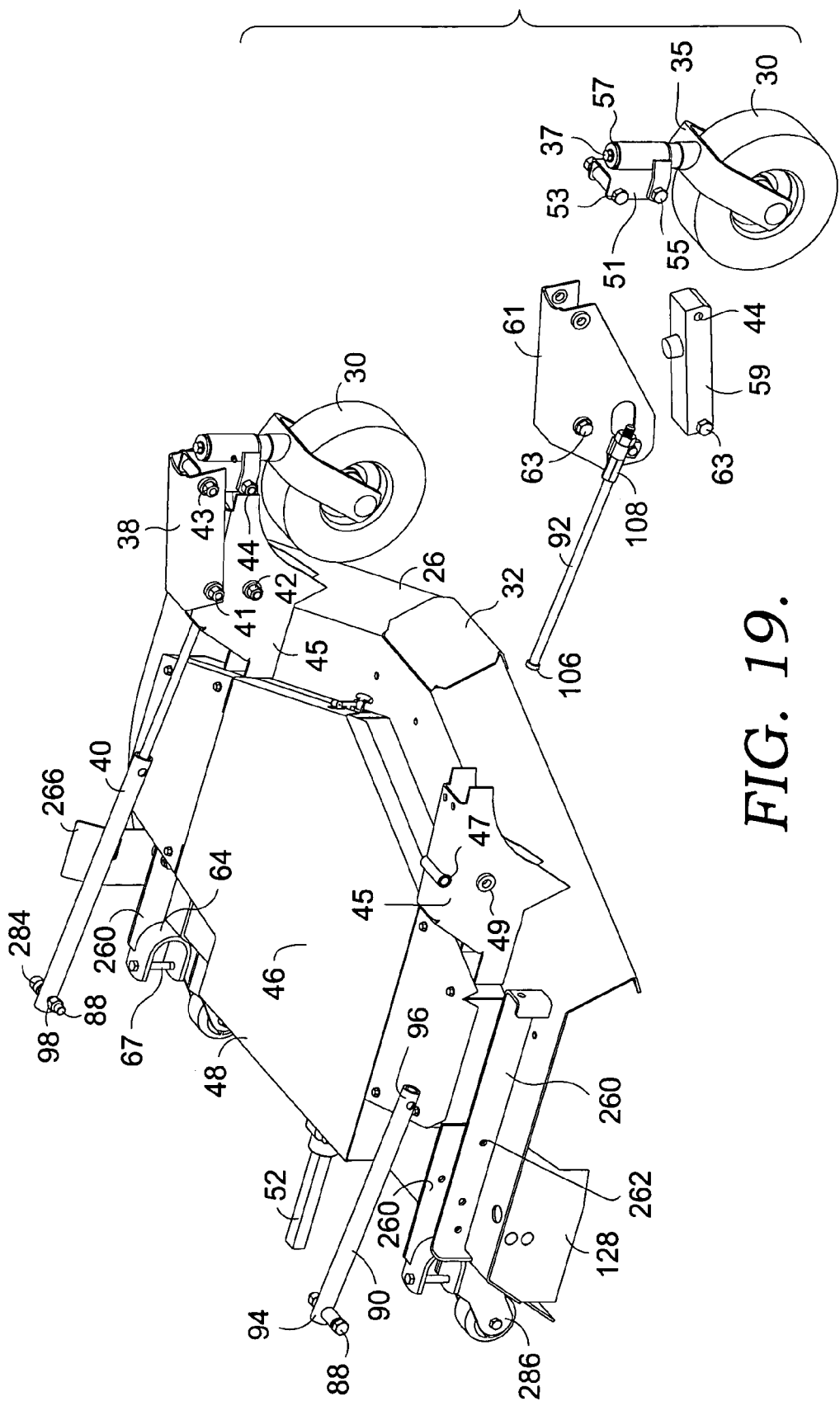

The mower height adjustment assembly 36 includes two parallel linkage assemblies 38 which are coupled on one end to a caster wheel 30 and on the other end to a front wheel height adjustment linkage arm 40. As is readily apparent to one of ordinary skill in the art, each parallel linkage 38 has four pivot points, namely, upper and lower rear pivot points 41, 42, respectively, and upper and lower front pivot points 43, 44, respectively. The front 32 of the deck 10 has two towers 45, each for supporting a caster wheel 30. As best illustrated in FIG. 19, each tower 45 has an upper horizontal passage 48 and a lower horizontal passage 49. A wheel member 51 similarly has an upper horizontal passage 53 and a lower horizontal passage 55. The wheel member 51 also has a vertical passage 57 for rotatably receiving the shaft 37 of the caster wheel 30. The wheel member 51 is pivotably coupled with the tower 45 by a lower link bar 59 and an upper link member 61. A bolt 63 passes through the lower passage 49 in the tower and through the link bar 59 to create the lower rear pivot point 42 while another bolt 63 passes through the upper passage 47 in the tower and through the link member 61 to create the upper rear pivot point 41. Similarly, another bolt 63 passes through the lower passage 55 in the wheel member 51 and through the link member 61 to create the upper front pivot point 43. The link member 61 also includes a tongue 65 which extends downwardly and rearwardly from the upper rear pivot point 41. The height adjustment linkage arm 40 is pivotally coupled to the tongue 65 of the link member 61. As discussed in greater detail below this arrangement (i.e., the parallel linkage assemblies 38 permit the user to raise and lower the front caster wheels 30 to adjust the cutting height of the deck while maintaining the shaft 37 in a generally vertical position.

A covering 46 is positioned on top of the housing 26 and covers the drive assembly (not shown) which connects the various blades 28. The drive assembly generally takes the form of a plurality of pulleys interconnected by belts. Adjacent a rear 48 of the deck 10 is a gear box 50 (best illustrated in FIG. 8). The gear box 50 is connected to a drive shaft 52 via a U-joint 54. A distal end 56 of the drive shaft 50 is coupled with the power take off 24. The drive shaft 52 is preferably non-round and, as illustrated, can be square in cross-section. A second U-joint 58 is preferably coupled to the power take off 24 and has a tubular drive shaft 60 extending outwardly therefrom. The distal end 56 of the drive shaft 52 is slidably received in the tubular drive shaft 60 in telescoping fashion. This arrangement permits the drive shaft 52 to slide back and forth in the tubular drive shaft 60 as the deck 10 is moved from the use position to the storage/servicing position, thereby permitting the blade drive assembly to remain mechanically coupled with the vehicle 14 when the deck 10 is in the use position, the storage/servicing position and any position therebetween. This arrangement eliminates the necessity of requiring the use disconnect the drive shaft of the mower deck from the vehicle prior to flipping the deck to the storage/servicing position, as was required in the prior deck disclosed in U.S. Pat. No. 6,347,503.

The mower height adjustment assembly 36 also includes a lift shaft 62 that is coupled to and extends transversely across the rear 48 of the deck 10. The lift shaft 62 is pivotally coupled with the deck 10 by clevis like U-shaped receiving members 64 at opposite ends of the lift shaft 62. With reference to FIG. 1, the upper portions of receiving members 64 are shown. Each receiving member 60 curves downwardly from its upper portion to the lower portion to form a U-shaped receiving aperture (best illustrated in FIG. 19). The open end of each U-shaped aperture faces toward the vehicle 14. The lift shaft 62 is held in the U-shaped apertures of receiving members 64 by bolts 67.

The lift shaft 62, unlike that disclosed in U.S. Pat. No. 6,347,503, includes an offset section 66 intermediate the ends of the lift shaft 62. The offset section permits the relative height of the gear box 50 to be raised in the mower deck 10 by going around the U-joint 54 while still permitting the lift shaft 62 to function as a single unitary piece.

A pair of hitch arms 68 are connected to and extend outwardly from the lift shaft 62 in a direction rearwardly of the deck 10. At a distal end 70 of each hitch arm 68, a hook member 72 is provided to facilitate coupling the mower deck 10 with the vehicle 14. The hook member 72 include retractable latch pin mechanisms 74 to permit a user to readily couple and uncouple the hook member 72 in the manner more fully described in U.S. Pat. No. 5,528,886.

A pair of actuating members 78 are coupled at their proximal ends 80 to the lift shaft 62 on opposite sides of the offset section 66. Each actuating member 78 includes a pair of upstanding support plates 82 spaced apart from one another in a generally parallel relationship. The support plates 82 of an actuating member 78 are connected to the lift shaft 62 in a spaced apart relationship in such a manner that they are on opposite sides of one of the U-shaped receiving members 64 when the lift shaft 62 is coupled to the deck 10. At a distal end 84 of the actuating member 78, the support plates 82 have a bore 86 therethrough for receiving a bolt 88.

As best illustrated in FIG. 17, the front wheel height adjustment linkage arm 40 includes a sleeve 90 that slidably receives a rod 92 in telescoping fashion. The sleeve 90 is generally tubular in nature and has a proximal end 94 and a distal end 96. A transverse bore 98 is positioned through the sleeve adjacent the proximal end for receiving the bolt 88 of one of the actuating members 78. A reduced diameter portion at the distal end 96 of the sleeve 90 forms an annular ledge 100 that functions as a stop to retain the rod 92 in the sleeve 90.

The rod 92 has a proximal end 102 and a distal end 104. The distal end 104 has an enlarged diameter section 106 that cooperates with the annular ledge 100 of the sleeve 90 to maintain the rod 92 in the sleeve 90 during use. The proximal end 102 of the rod 92 is coupled with the upper link member 61 of the parallel linkage 38 to facilitate adjustment of the mowing height. In the illustrated embodiment, the rod 92 is coupled with the upper link member 61 by way of a connector 108. The connector has a tube portion 110 with a tongue portion 112 extending outwardly therefrom. The tongue portion 112 has a bore 114 therethrough and a bolt 116 passes through the bore 114 to mechanically couple the connector 108 to the upper link member 61. The tube portion 110 of connector 108 is slidably received on the proximal end 102 of the rod 92 and is positioned intermediate a nut 118 and a spacer nut 120. The proximal end 94 of the rod 92 is externally threaded to receive the nuts 118, 120. This arrangement permits the user to adjust the overall length of the linkage arm 40 by moving the connector 108 up and down the rod 92.

The mower height adjustment assembly 36 further includes a mowing height control plate 122 and a mowing height adjustment lever 124. The height control plate 122 is mounted on an upper surface 126 of the housing 26 adjacent a discharge side 128 of the deck 10. The height control plate 122 is semi-circular in nature and is mounted in an upstanding position which resembles a fin. An upper edge 130 of the height control plate 122 includes a plurality of notches 132 therein to cooperate with the height adjustment lever 124 to maintain the same in a desired location as described in greater detail below. The upper edge 130 generally presents an arcuate surface.

Figure 18:
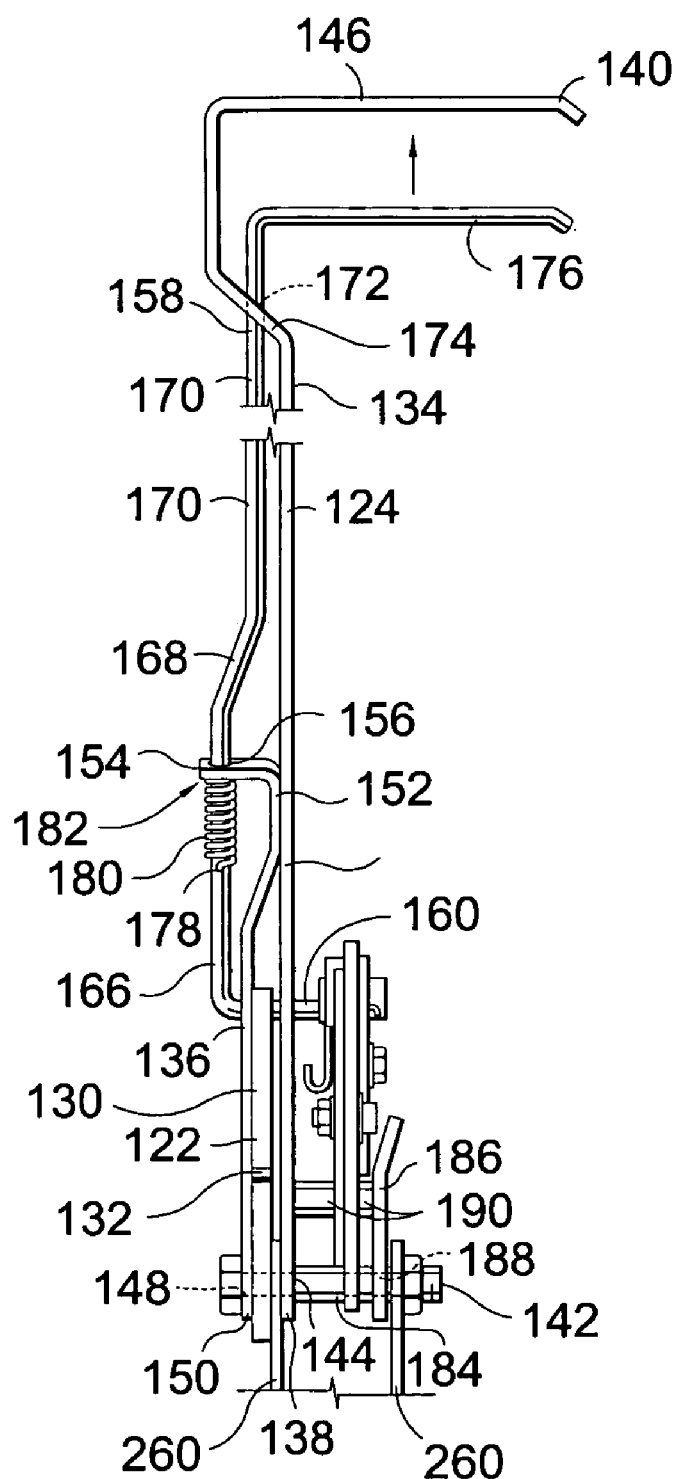

The height adjustment lever preferably includes first and second arms 134, 136 respectively, as best illustrated in FIG. 18. The first arm 134 is the longer of the two arms 134, 136 and has a proximal end 138 and a distal end 140. The first arm 134 is pivotally coupled to the deck 10 by receiving a bolt 142 through an aperture 144 located adjacent its proximal end 138. The distal end 140 of the first arm 134 is bent to form a handle portion 146. The second arm 136 is also pivotally coupled to the deck 10 by receiving the bolt 142 through an aperture 148 in a proximal end 150 of the second arm 136.

As best illustrated in FIG. 18, an upper portion of the second arm is bent inwardly such that an abutting portion 152 of the second arm 136 abuts the first arm 134. The second arm 136 is connected to the first arm 134 preferably by welding the abutting portion 152 to the first arm 134. A distal end 154 of the second arm 136 is bent outwardly and is generally perpendicular to the first arm 134. A bore 156 through the second arm 136 adjacent the distal end 154 serves as a guide for a rod 158.

The rod 158 has a lowermost first section 160 that is generally horizontal and is perpendicular to the first and second arms 134, 136. The first section 160 passes through an elongate opening 162 in the second arm 136 and an elongate opening 164 in the first arm 134. A second section 166 of the rod 158 is generally perpendicular to the first section 160 and is generally parallel to the first arm 134. The second section 166 is slidably received in the bore 156 in the second arm 136 and the bore 156 limits the vertical movement. The second section 166 transitions to a third section 168 that is angled towards the first arm 134 and the third section transitions to a fourth section 170 that is adjacent and generally parallel to the first arm 134. The fourth section 170 passes through an opening 172 in an angled section 174 of the handle portion 146 of the first arm 134. The fourth section 170 transitions into a fifth section 176 that is generally perpendicular to the fourth section 170. The second section 166 includes a bore 178 therein for receiving an end of a spring 180. The spring 180 is received on the second section 166 of the rod 158 intermediate the bore 178 and a lower surface 182 of the second arm 136 adjacent its distal end 154. The spring works to bias the rod 158 to a lowermost or engaged position, as illustrated in FIG. 18.

A pivot tube 184 is connected to the first arm 134 opposite the second arm 136 and adjacent the aperture 144. The pivot tube 134 is coaxial with the aperture 144 and receives the bolt 142. A stub plate 186 is connected to the pivot tube 184 opposite the first arm 134. The stub plate is generally parallel to the first arm 134 and includes an aperture 188 for receiving the bolt 142.

An abutment rod 190 is positioned between the first arm 134 and the stub plate 186 and is generally parallel to the pivot tube 184. The abutment rod 190, as illustrated, is cylindrical in nature with an outer diameter approximately equal to an outer diameter of the pivot tube 184.

The mowing height adjustment assembly 30 also includes a primary latch member 192, as best illustrated in FIGS. 10-15. The primary latch member 192 has a latch plate 194 and an adjustment plate 196. The latch plate 194 has a proximal end 198 and a distal end 200. The latch plate 194 includes an elongate opening 202 which receives the bolt 88 to pivotally couple the latch plate 194 between the support plates 82 of the actuating member 78 on the discharge side 128 of the mower deck 10. The latch plate 194 further includes two internally threaded bolt holes 204 for receiving bolts 206 to couple the adjustment plate 196 to the latch plate 194. The latch plate 194 has a cutout 208 which creates a ledge 210. The cutout 208 receives a flange of the adjustment plate 196. An adjustment bolt 214 passes through an aperture 216 in the flange 212 and cooperates with the ledge 210 to permit the user to adjust the relationship between the adjustment plate 196 and the latch plate 194.

The adjustment plate also has two elongate openings 218 which align with the bolt holes 204.

A pivot tube 220 is provided in the adjustment plate 196 to create an opening therethrough. The pivot tube receives the bolt 88 to rotatably couple the adjustment plate 196 with the discharge side 128 actuating member 78. A portion of the pivot tube 220 is received in the elongate opening 202 of the latch plate 194. It would be readily understood to one of ordinary skill in the art that, as the user tightens the adjustment bolt 214, the distal end 200 of the latch plate 194 is moved away from the actuating member 82 as the pivot tube 220 slides along the elongate opening 202. When the latch plate 194 is in the desired location, the bolts 206 can be tightened to prevent movement between the latch plate 194 and the adjustment plate 196.

The latch plate 194 further includes a notch 222 in a bottom edge 224 of the latch plate 194. The notch 222 is generally U-shaped in nature and is sized to receive the abutment rod 190 of the mowing height adjustment lever 124, as discussed in greater detail below.

A secondary latch member 226 is rotatably coupled to the latch plate 194 of the primary latch member 192 via a bolt 228. The bolt 228 passes through an elongate opening 230 in the secondary latch member 226 and an aperture 232 in the primary latch member 194. An opening 234 is provided in the latch plate 194. The opening 234 has an arcuate section 236 and a straight section 238. A bolt 240 passes through an aperture 242 in the secondary latch member and is slidably received in the opening 234 in the primary latch member 192. The arcuate section 236 of the opening 234 is formed by a radius from the center of the aperture 232 in the latch plate 194. Accordingly, as the secondary latch member 226 is moved from a latched position illustrated in FIG. 12 to an unlatched position illustrated in FIG. 13, the secondary latch member 226 pivots on the bolt 228 and the bolt 240 travels along the arcuate section 236 of the opening 234 in the latch plate 194 until the bolt 240 reaches the straight section 238 of the opening 234. When the bolt 240 reaches the straight section 238, the elongate opening 230 in the secondary latch member 226 is generally parallel to the straight section 238. The motion of the secondary latch member 226 then shifts from a pivoting motion, where the secondary latch member 226 is rotating about the bolt 228, to a sliding motion as the bolt 240 slides down the straight section 238 and the secondary latch member 226 moves towards the housing 26 to the open position illustrated in FIG. 13. As the bolt 240 is sliding down the straight section 238, the elongate opening 230 in the secondary latch member 226 slides down the bolt 228. This arrangement permits the secondary latch member 226 to be stored in the open position illustrated in FIG. 13. When the user desires to move the secondary latch from the open position of FIG. 13 to the latched position of FIG. 12, the user must first lift the secondary latch member 226 in the direction indicated by the arrow in FIG. 13 until the bolt 240 enters the arcuate section 236 of the opening. The user can then pull the secondary latch member 226 forward until it is in the latched position.

To facilitate moving the secondary latch member 226, an opening 244 is provided in the secondary latch member 226 to create a handle portion 246. The secondary latch member 226 also includes a notch 248 in an edge 250 of the secondary latch member 226. The notch 248 in the secondary latch member 226 is similar to the notch 222 in the primary latch member 192 and will be discussed in greater detail below.

A spring 252 is provided to bias the primary latch member 192 downwardly, as illustrated in FIGS. 10-15, so that the distal end 200 of the primary latch member 192 abuts the upper surface 126 of the housing 26. The spring 252 has a first end 254 which is wrapped around one of the support plates 82, a second end 256 which is wrapped around the primary latch member 192 in the cutout 208, and a coil section 258 intermediate the ends 254, 256. The pivot tube 220 of the adjustment plate 196 is received in the coil section 258 of the spring 252.

The deck 10 has a plurality of upstanding rails 260 mounted to the upper surface 126 of the housing 26. The rails 260 include a plurality of apertures 262 therein to permit the coupling of various components of the mower height adjustment assembly 36 to the mower deck 10 by way of bolts 264. For example, the mowing height control plate 122 is bolted to one of the rails 260 and the bolt 142 passes through two of the rails 260 to pivotally couple the mowing height adjustment lever 124 to the deck 10. In the embodiment illustrated, one of the rails 260 terminates at a rearward end at one of the U-shaped receiving members 64.

The deck 10 further includes a latch plate 266 (best illustrated in FIGS. 6, 9, 16 and 17) for automatically securing the deck 10 in the storage/servicing position when the deck 10 is moved from the use position to the storage/servicing position. The latch plate 266 has and aperture 268 therethrough adjacent a proximal end 270. The latch plate 266 is coupled to a rail 260 on the upper surface 126 of the housing 26 opposite the discharge side 128 via a bolt 272 through the aperture 268. A spring 274 (best illustrated in FIG. 16) is positioned on the bolt 272 intermediate the head of the bolt 272 and the latch plate 266 to bias the latch plate toward the discharge side 128 of the deck 10.

Figure 9:
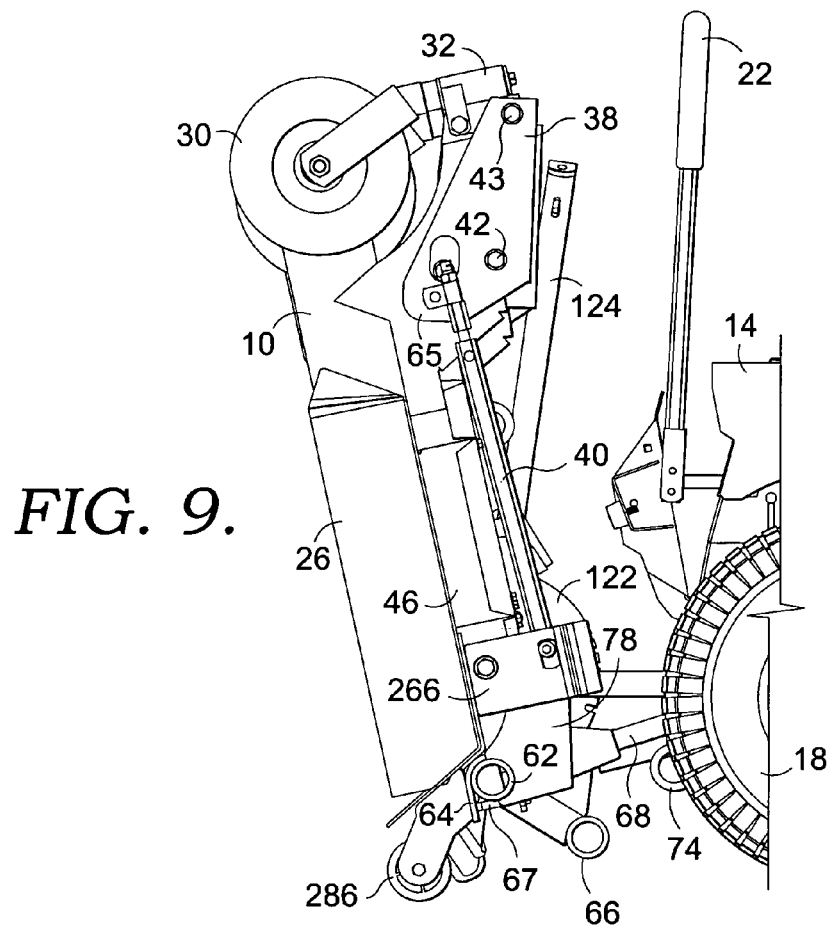

The latch plate 266 further includes an elongate opening 276 therethrough. The latch plate 266 also has a bend 278 therein to provide an angled portion 280 adjacent a distal end 282. The angled portion 280 bends away from the discharge side 128 of the deck 10. The bolt 88 in the actuating member 78 opposite the discharge side 128 includes an extension 284. The extension 284 cooperates with the elongate opening 276 in the latch plate 266 to retain the deck 10 in the storage/servicing position, as illustrated in FIG. 9 and as discussed in greater detail below.

Turning now to FIG. 1, at this point, the deck 10 is sitting on the ground and is maneuverable by virtue of the fact it is resting on the caster wheels 30 and anti-scalp wheels 286 at the rear 48 at the deck 10. The mowing height adjustment lever 124 is in an upright position. The user first rolls the deck 10 toward the vehicle 14 and couples the deck 10 to the vehicle 14 by the hook members 72. The drive shaft 52 is slidably received in the tubular drive shaft 60.

Figure 2:
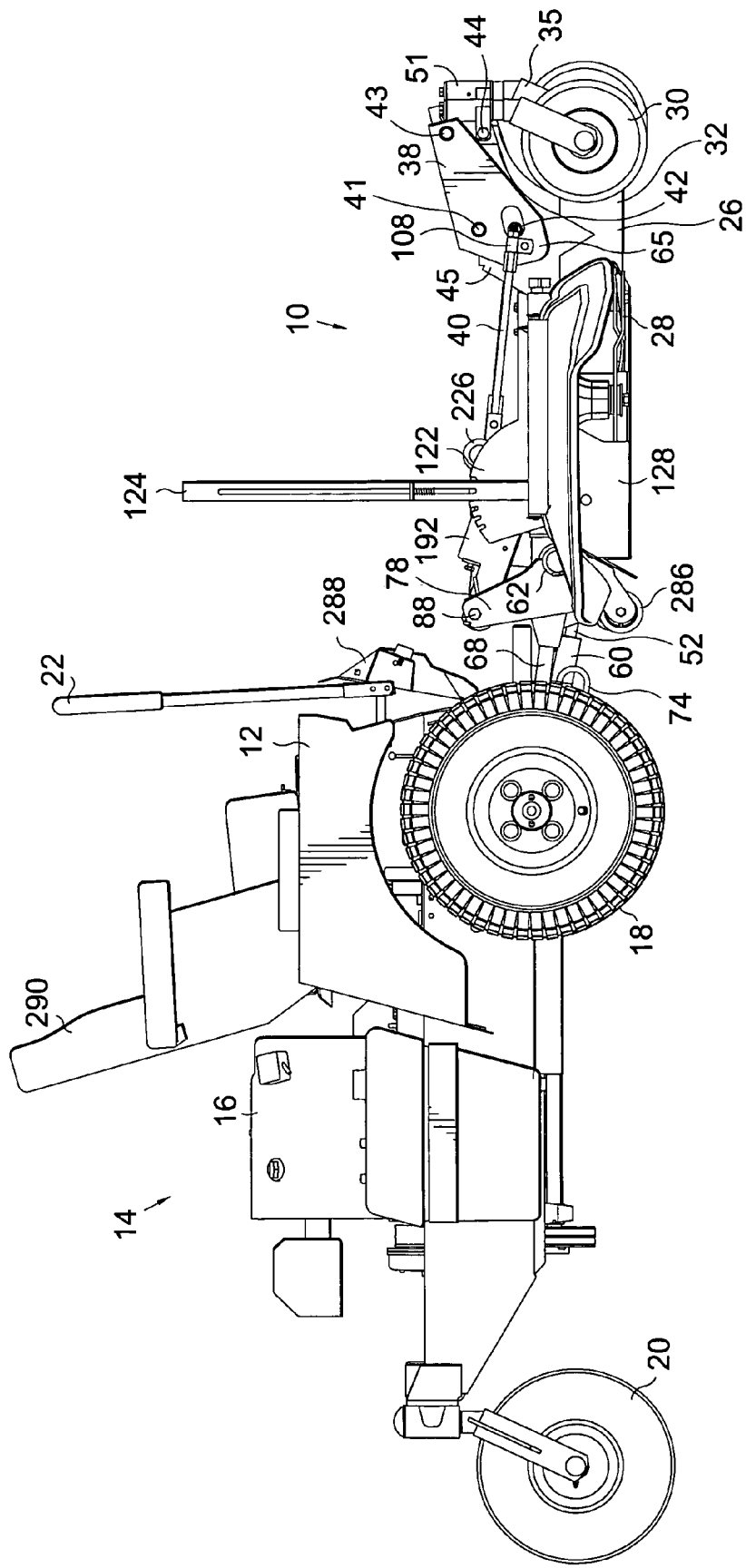
Figure 3:
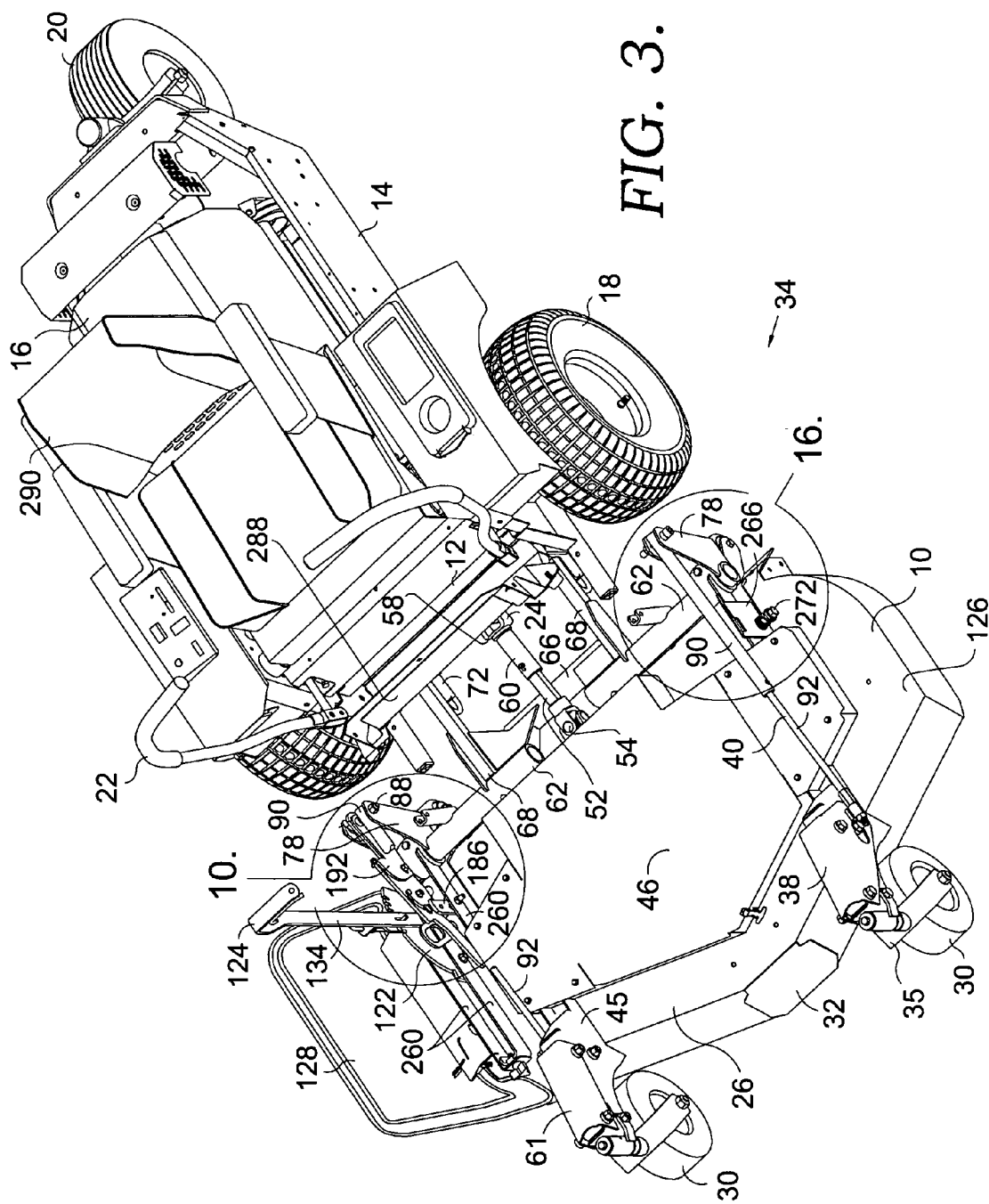
Figure 4:
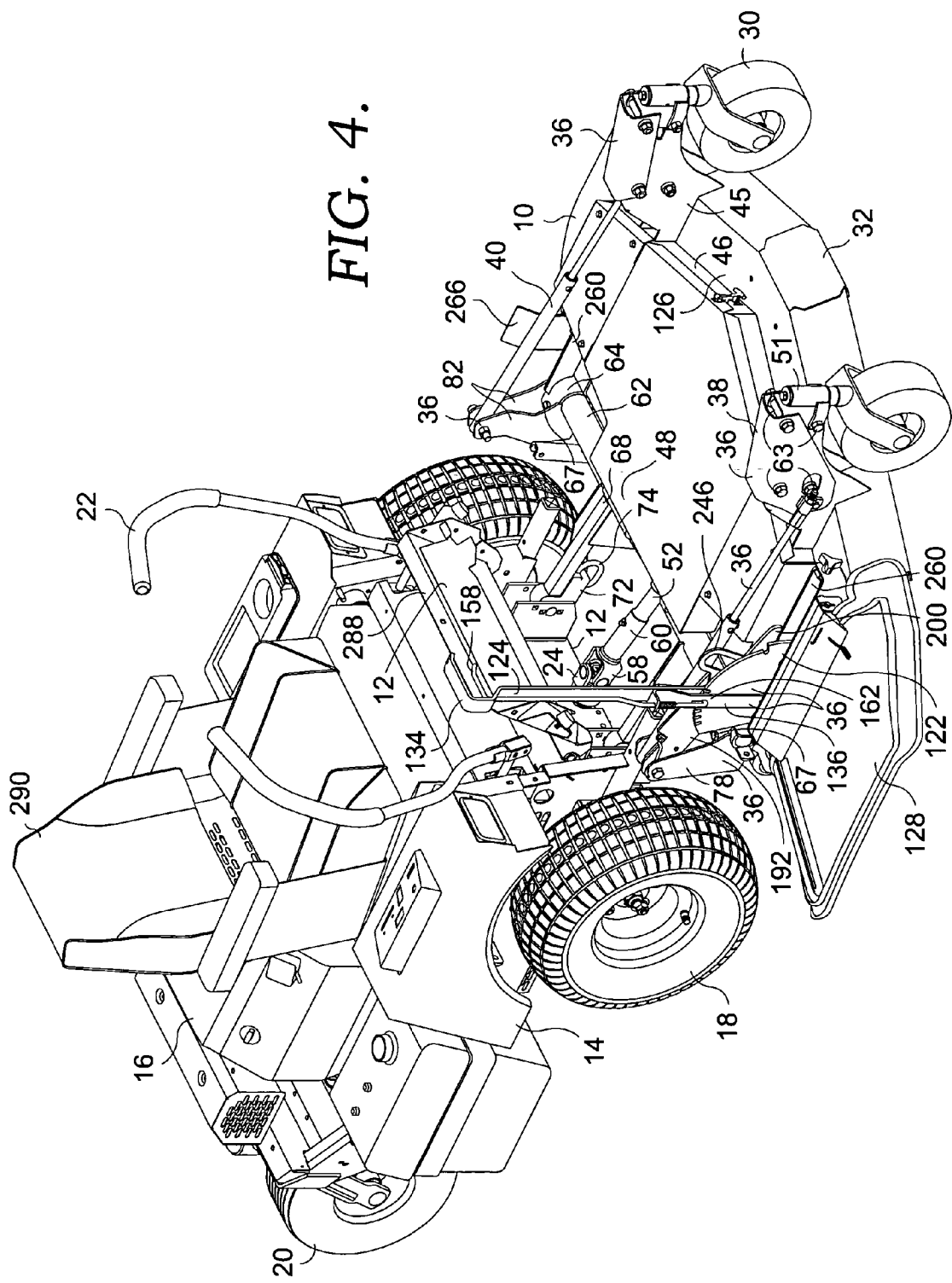

FIGS. 2-4 illustrate the deck 10 coupled to the propelling vehicle 14 with the deck 10 in a use position and the mowing height adjustment lever 124 in an upright position. To provide a better view of the connection between the deck 10 and the vehicle 14, a footrest 288 of the vehicle 14 has been illustrated in a raised and generally vertical position. During use of the mower 34, the footrest 288 would be in a generally horizontal orientation.

As illustrated in FIG. 2, the cutting height of the mower deck 10 is in a set position as the first section 160 of the rod 158 of the mower height adjustment assembly 36 is received in a notch 132 in the mowing height control plate 122. To change the cutting height, the user would, while seated in a seat 290 of the vehicle 14, grasp the handle portion 146 of the first arm 134 of the mowing height adjustment lever 124 with their right hand. The palm of their hand would rest on top of the handle portion 146 while the user's fingers would wrap around the fifth section 176 of the rod 158. The user would then close their hand, thereby moving the fifth section 176 of the rod 158 towards the handle portion 146 which would in turn raised the rod 58 and, more importantly, lift the first section 160 out of the notch 132 in the mowing height control plate 122.

Once the rod 158 is disengaged from the notch 132 of the control plate 122, the user could raise the cutting height by pulling the mowing height adjustment lever 124 towards them or lower the cutting height by pushing the mowing height adjustment lever 124 away from them (i.e., towards the front 32 of the mower deck 10). In the embodiment illustrated in FIG. 2, the cutting height can be lowered one setting, as one notch 132 is forward of the rod 158, and can be raised up to four settings, as four notches 132 are to the rear of the illustrated position of the rod 158. The notches 132 are preferably spaced apart in a predetermined manner that movement of the rod 58 from one notch to 132 the next adjoining notch 132 changes the cutting height by a half inch increment. When the deck is raised or lowered to the desired cutting height, the user releases their grip on the fifth section 176 of the rod 158 and the spring 180 lowers the rod 158 and in turn the first section 160 down into the corresponding notch 132.

Figure 13:
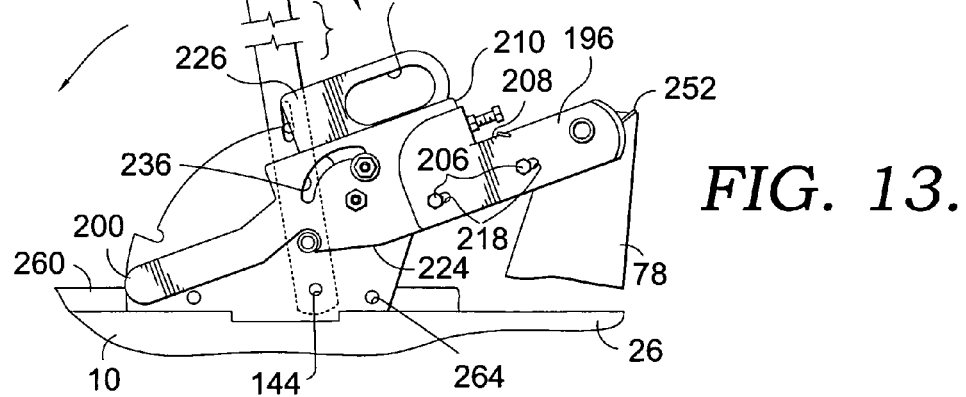

When the mower height adjustment lever 124 is in the upright position, as illustrated in FIG. 2, the abutment rod 190 is received in the notch 222 in the latch plate 194 of the primary latch member 192, as illustrated in FIG. 13. When the rod 158 is not received in a notch 132 of the mowing height control plate 122 and the user pulls the mowing height adjustment lever 124 towards the vehicle 14, the mower height adjustment lever 124 pivots on the bolt 142 and the abutment rod 190 is moved towards the rear 48 of the deck 10. Because the abutment rod 190 is received in the notch 222 of the latch plate 194, the rearward movement of the abutment rod 190 is transferred through the primary latch member 192 to the actuating member 78. This movement causes the distal end 84 of the actuating member 78 on the discharge side 128 of the mower to also move towards the vehicle 14. As the actuating member 78 is coupled with the lift shaft 62 at its proximal end 80, the rearward movement of the distal end 84 of the actuating member 78 causes the lift shaft 62 to rotate in the U-shaped receiving member 64.

When the deck 10 is in the use position illustrated in FIG. 2, the control arms 40 are in their fully extended position with the enlarged diameter section 106 of the rod 92 abutting the annular ledge 100 of the sleeve 90. Accordingly, as the distal end 84 of the actuating member 78 on the discharge side 128 of the deck 10 is moved rearwardly, the sleeve 90 of the control arm 40 is moved towards the vehicle 14 by virtue of the fact that the proximal end 94 of the sleeve 90 is coupled with the bolt 88 in the actuating member 78. The sleeve 90 in turn pulls the rod 92 rearwardly which in turn pulls on the tongue 65 to activate the parallel linkage 38. As the control arm 40 pulls the tongue 65 rearwardly, the upper link member 61 rotates about the upper rear pivot point 41, thereby moving the front of the upper link member 61, and in turn the castor wheel 30, downwardly. The lower link bar 59 remains parallel to the upper link member 61 and cooperate therewith to maintain the shaft 37 of the castor wheel 30 in a vertical orientation at all times. Accordingly, as the mowing height adjustment lever is pulled rearwardly, the parallel linkage 38 works to lower the front caster wheel 30.

The actuating member 78 opposite the discharge side 128 is also simultaneously rotating rearwardly as it is connected to the rotating lift shaft 62. This actuating member 78 pulls on its control arm 40 to actuate the other parallel linkage 38 to lower the other caster wheel 30 by the same amount. Accordingly, by pulling back on the mowing height adjustment lever 124, the primary latch member 192 causes both actuating members 78 to rotate rearwardly thereby forcing the control arms 40 to actuate the parallel linkages 38 to lower the front caster wheels 30. To lower the cutting height, the user simply moves the mowing height adjustment lever 124 forward until the desired cutting height is achieved. The weight of the deck 10 on the front caster wheels 30 continually tries to pull the mower height adjustment lever 124 forward. This force is counteracted by receiving the rod 158 and one of the notches 132 in the mowing height control plate 122.

Figure 5:
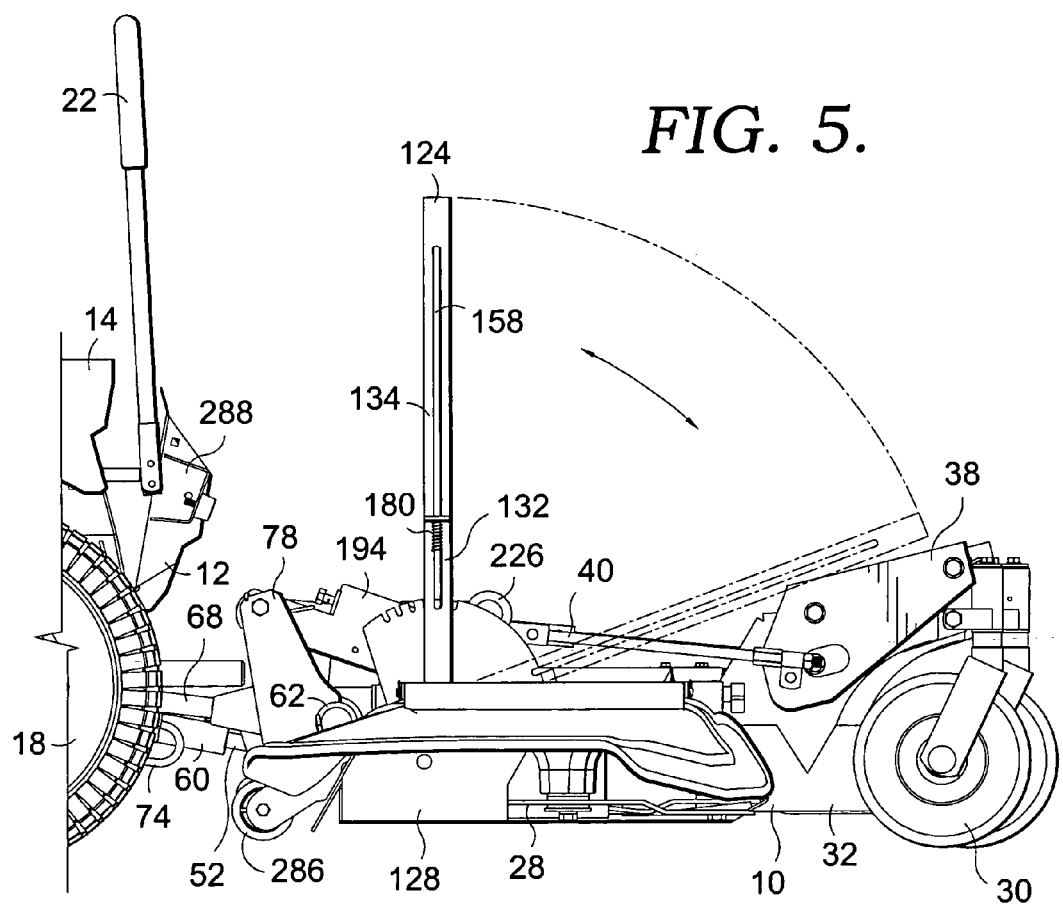
Figure 7:
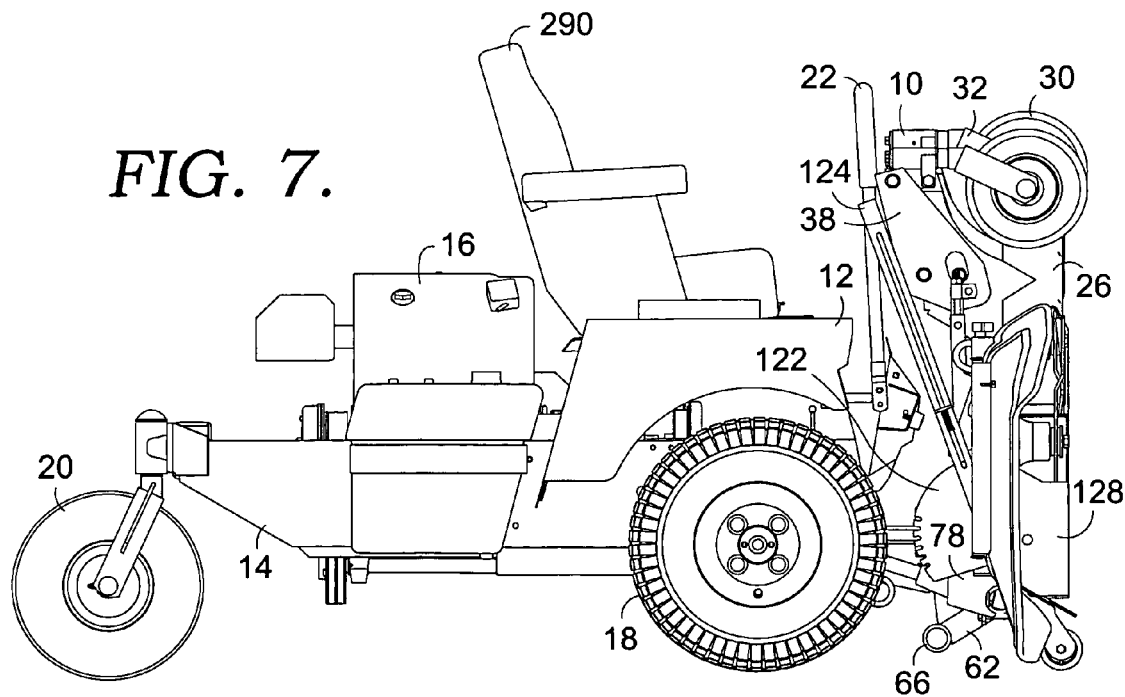
Figure 8:
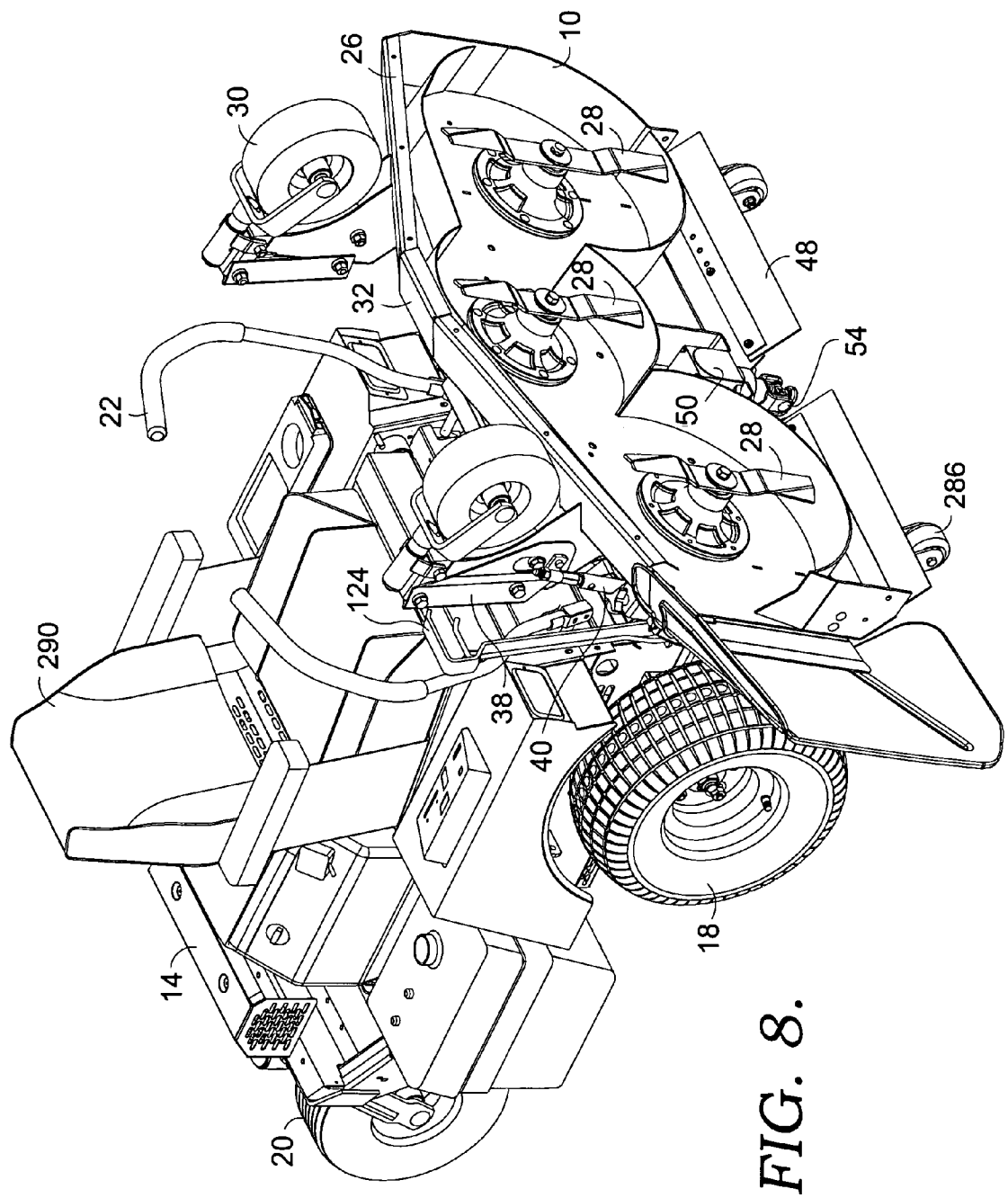

To move the deck 10 from the use position illustrated in FIGS. 2-4 to the storage/servicing position illustrated in FIGS. 7-9, the user first moves the mowing height adjustment lever 124 from the upright position to a collapsed position, as illustrated in FIGS. 5 and 6. To do this, the user pulls up on the fifth section 176 of the rod 158 to remove the rod from its engagement with one of the notches 132 in the mowing height control plate 122. The user then pushes the handle portion 146 of the mowing height adjustment lever 124 away from the vehicle 14. Once the lever 124 is moved sufficiently forward that the first section 160 of the rod 158 clears the forwardmost upper notch 132, which represents the lowest mowing height setting, the user may release the rod 158. The first section 160 of the rod 158 then rides along the upper edge 130 of the mowing height control plate 122 until the height adjustment lever 124 is in the collapsed position, wherein the spring 180 will force the first section 160 of the rod 158 into the lowermost and forwardmost notch 132 in the mowing height control plate 122 to retain the mowing height adjustment lever in the collapsed position.

Figure 10:
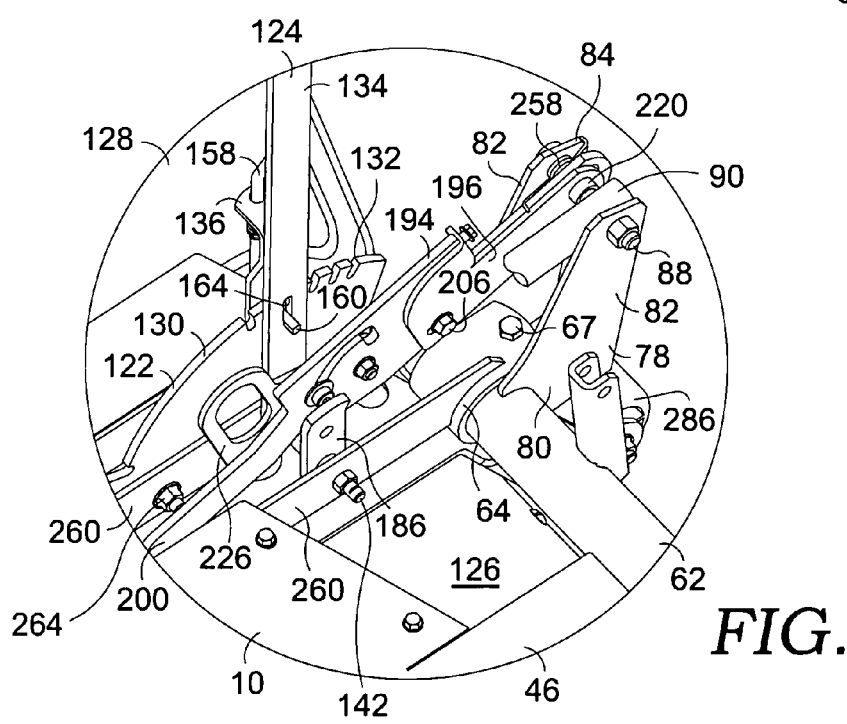
Figure 11:
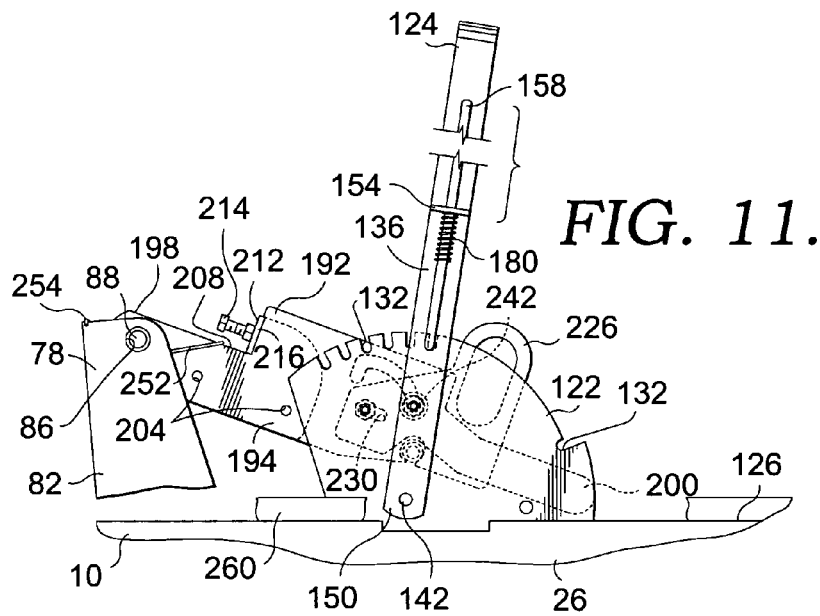

Turning now to FIGS. 10-14, movement of the mowing height adjustment lever 124 from the upright to the collapsed position is illustrated. FIGS. 10 and 11 illustrate the mowing height control arm 124 in the upright position with both the primary and secondary latch members 192, 226 engaged with the abutment rod 190 of the mowing height adjustment lever 124. The primary latch member 192 is all that is necessary to be engaged with the abutment rod 190 during operation of the mower 34. With just the primary latch member 192 engaged, the deck 10 is free to float during mowing and move up and down with corresponding changes in the terrain being mowed. The abutment rod 190 and the primary latch member 192 still cooperate to control the cutting height and to prevent movement of the deck from the use position all the way to the storage/servicing position, provided the mowing height adjustment lever 124 remains in an upright position by the rod 158 being engaged with the mowing height control plate 122.

The secondary latch member 226 is provided to lock the abutment rod 190 into engagement with the primary latch member 192. In this arrangement, the deck can be made not to float and, in fact, by moving the lever 124 forward, the user can force the deck down to a lower position. Additionally, having the secondary latch member 226 in the latched position, illustrated in FIGS. 11 and 12 is necessary if hydraulics are used to raise and lower the deck 10.

Figure 12:
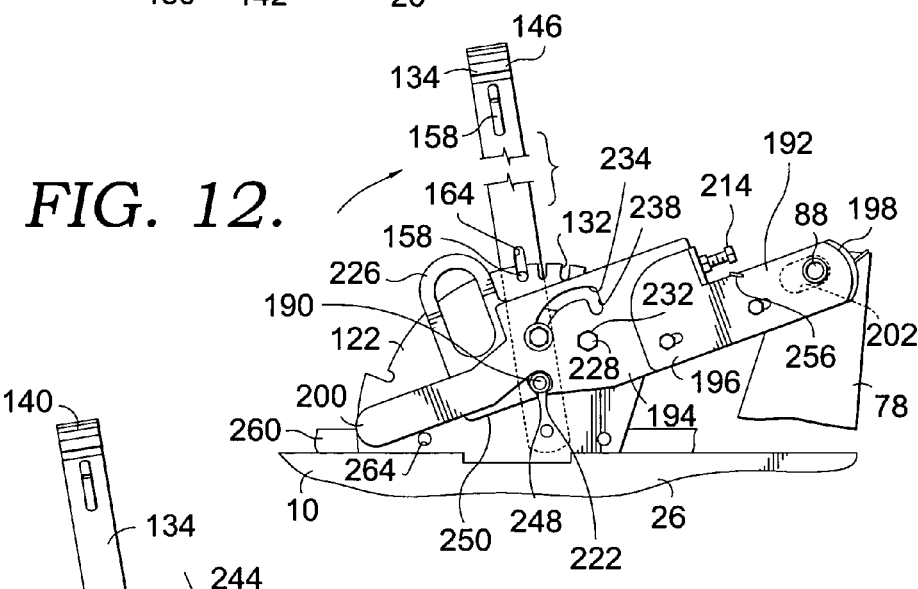

With the mower height adjustment assembly 36 arranged as illustrated in FIGS. 11 and 12, to move the deck 10 from the use position to the storage/servicing position, the user first disengages the secondary latch member 226 by pulling up on the handle portion 246 of the secondary latch member 226 to rotate it in the direction of the arrow in FIG. 12 from the latched position in FIG. 12 to the unlatched position illustrated in FIG. 13. Again, if the user does not use hydraulics to raise and lower the deck and desires the deck to float during use, the secondary latch member 226 would normally be in the unlatched position illustrated in FIG. 13 during operation of the mower 34.

Figure 14:
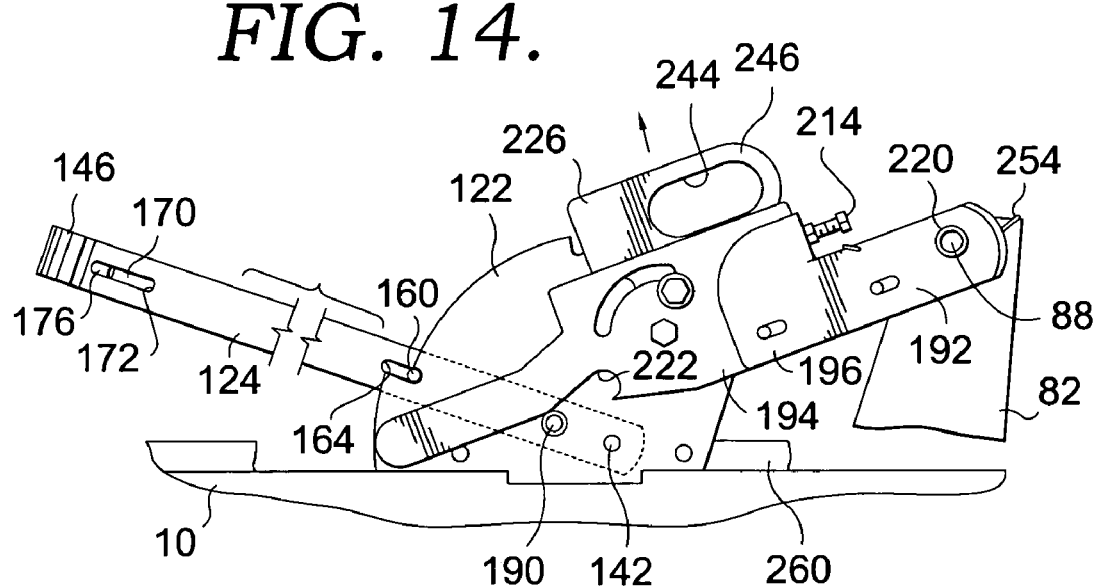

With the secondary latch member 226 unlatched, as illustrated in FIG. 13, the user can disengage the rod 158 from the mowing height control plate 122 and move the mowing height adjustment lever 124 from the upright position illustrated in FIG. 13 to the collapsed position illustrated in FIG. 14 by pushing the lever 124 in the direction of the arrow in FIG. 13. As the mowing height adjustment lever 124 moves from the upright position to the collapsed position, the abutment rod 190 rotates out of receipt in the notch 222 of the primary latch member 192 and therefore out of engagement with the primary latch member 192, as illustrated in FIG. 14. The deck 10 is now in a position to be moved from the use position to the storage/servicing position.

Figure 15:
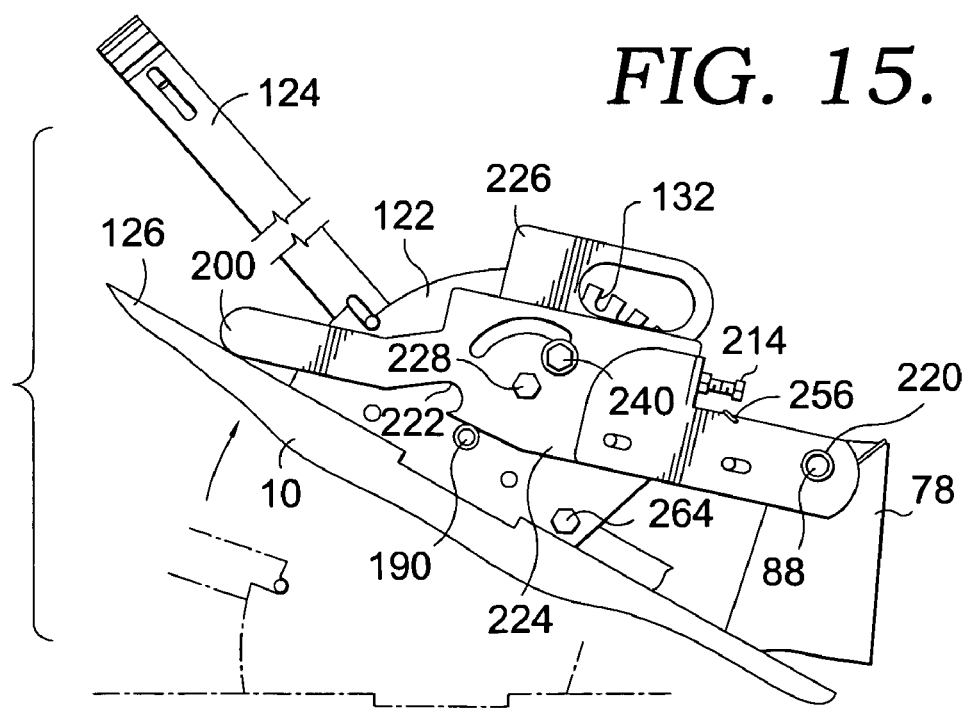

To move the deck from the use position to the storage/servicing position, the user now simply grabs the front 32 of the deck 10 and lifts upwardly. The housing 26 rotates around the lift shaft 62 by way of the U-shaped receiving member 64. The actuating members 78 which are connected to the lift shaft 62 remain in an upright position as illustrated in FIGS. 9, 15 and 17. As the front of the deck 10 is raised, as illustrated in FIG. 15, the distal end 200 of the primary latch member 192 slides along the upper surface 126 to the housing 26 and the primary latch member 192 is raised upwardly as it pivots around the bolt 88 of the actuating member 78. Also, as the front of the deck 10 is raised, the abutment rod 190 moves towards the notch 222 in the latch plate 194. However, the abutment rod 190 does not enter the notch 222 but instead goes slightly below the opening of the notch 222 and abuts the bottom edge 224 of the latch plate 194, as illustrated in FIG. 15. Because the abutment rod 190 does not get received in the notch 222 of primary latch member 192, the primary latch member 192 does not cooperate with the abutment rod 190 to prevent the front of the deck 10 from being raised to the storage/servicing position and the user can continue to raise the deck to the storage/servicing position.

Turning now to FIG. 17, as the deck 10 approaches the storage/servicing position by pivoting around the lift shaft 62, the angled portion 280 of the latch plate 266 comes in contact with the extension 284. As the deck 10 is continued to be pivoted to the storage/servicing position, the angled portion 280 of the latch plate 266 slides along the extension 284 and, because the spring 274 is provided on the bolt 272 that couples the latch plate 266 to the rail 260, the extension 284 deflects the latch plate 266 outwardly. When the deck 10 reaches the storage/servicing position, the extension 284 becomes aligned with the elongate opening 276 in the latch plate 260 and the spring 274 forces the latch plate 260 to its resting position, thereby receiving the extension 284 in the elongate opening 276 to retain the deck 10 in the storage/servicing position. The user can now let go of the front of the deck and the deck will stay in the storage/servicing position until the user desires to move the deck 10 back to the use position.

As illustrated in FIG. 17, by virtue of the telescoping arrangement between the sleeve 90 and the rod 92 of the control arms 40, as the deck 10 is moved from the use position to the storage/servicing position, the rod 92 slides into the sleeve 90 until it is almost fully received in the sleeve 90. This arrangement permits the control arms 40 to automatically shorten in length as the deck 10 is moved from the use position to the storage/servicing position.

When the user desires to return the deck from the storage/servicing position to the use position, the user simply pulls outwardly on the angled portion 280 of the latch plate 266 to remove the extension 284 from receipt in the elongate opening 276 of the latch plate 266. The user can then lower the front of the deck 10 back down until the front caster wheels 30 rest on the ground. As the front of the deck 10 is lowered back down, the control arms 40 automatically lengthen as the rod 92 of each control arm is gradually pulled out of its sleeve 90. To get the mower 34 ready to mow, the user then simply disengages the rod 158 from the lowermost notch 132 in the mowing height control plate 122 and lifts the mowing height adjustment lever 124 back up to an upright position where the rod 158 engages one of the upper notches 132. As the mowing height adjustment lever 124 is raised back up to an upright position, the abutment rod 190 is moved back up into receipt in the notch 222 in the primary latch member 192. Preferably, the abutment rod 190 is fully received in the notch 222 before the first section 160 of the rod 158 reaches the forwardmost notch 132 in the mowing height control plate 122 in the upper grouping of notches 132 such that the mowing height adjustment lever 124 causes the control arms 40 to reach their fully extended position, where the enlarged diameter sections 106 of the rods 92 are engaged with the annular ledges 100 of the sleeves 90, and in turn causes the front caster wheels to be lowered slightly before the mowing height adjustment lever 124 can be locked in the lowest mowing height setting.

Figure 20:
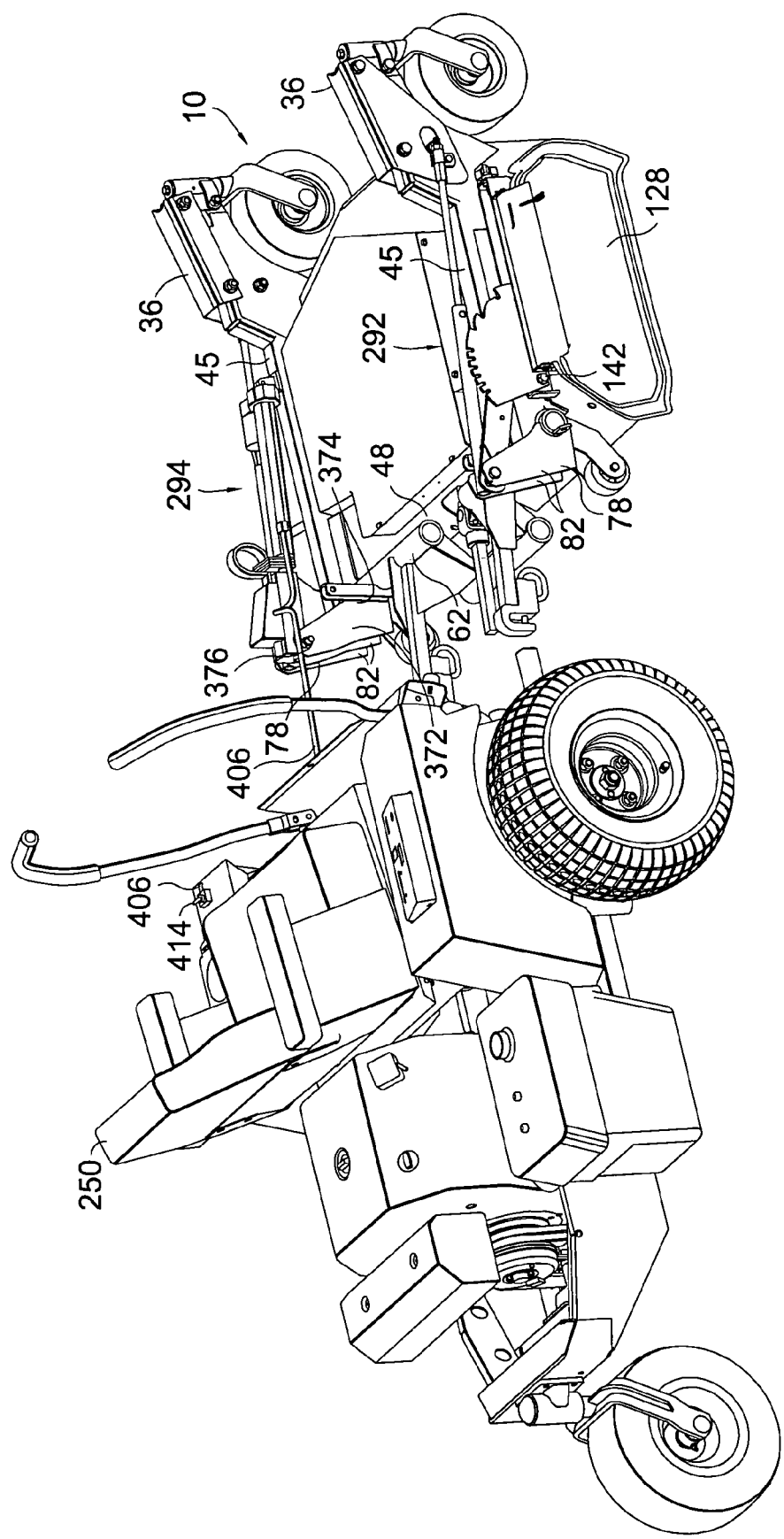
Figure 21:
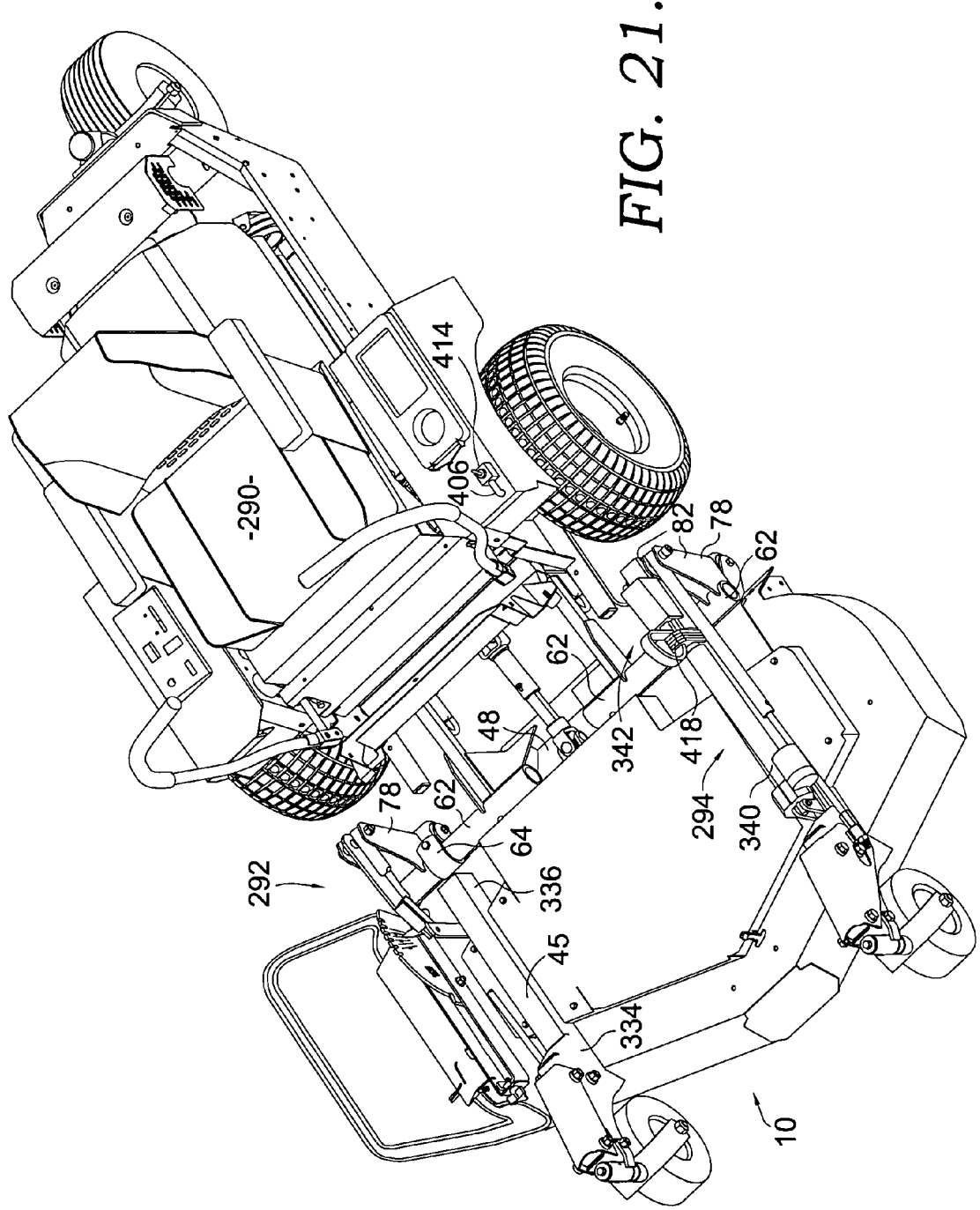

A second embodiment of the present invention is disclosed with reference to FIGS. 20-28. With specific reference to FIGS. 3 and 21, it will be noted that the mowing height adjustment lever 124, the primary latch 192 consisting generally of the latch plate 194 and the adjustment plate 196, the secondary latch member 226, and the deck latch 266 have been removed. As shown in FIGS. 20 and 21, the mower height assembly 36 now includes an indicator linkage 292 and an electronic height adjustment assembly 294. The towers 45 have been modified such that they extend to the rear 48 of the deck 10 as will be further discussed below. The remaining elements of the mower deck 10 remain virtually unchanged.

Figure 23:
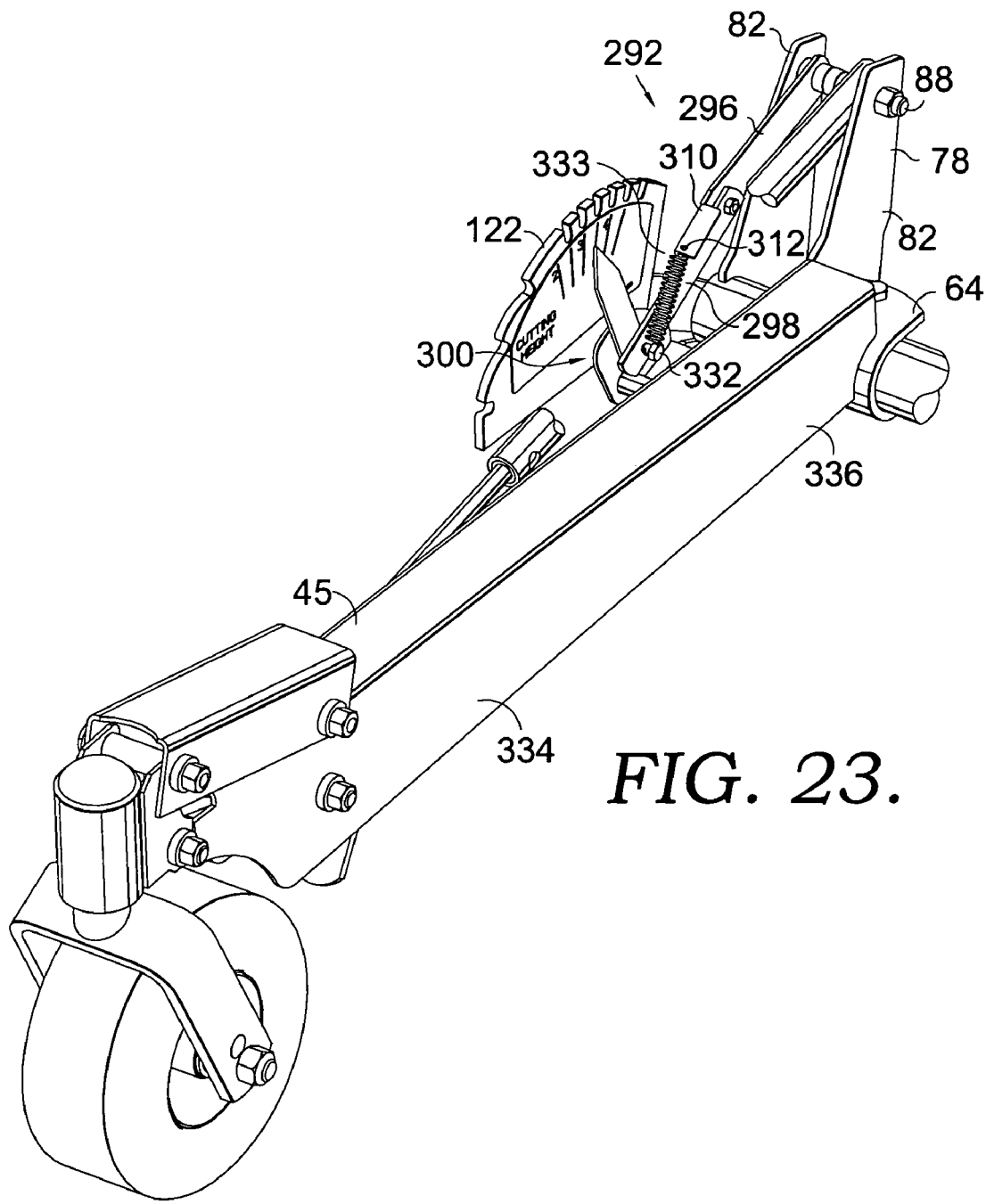
Figure 27:
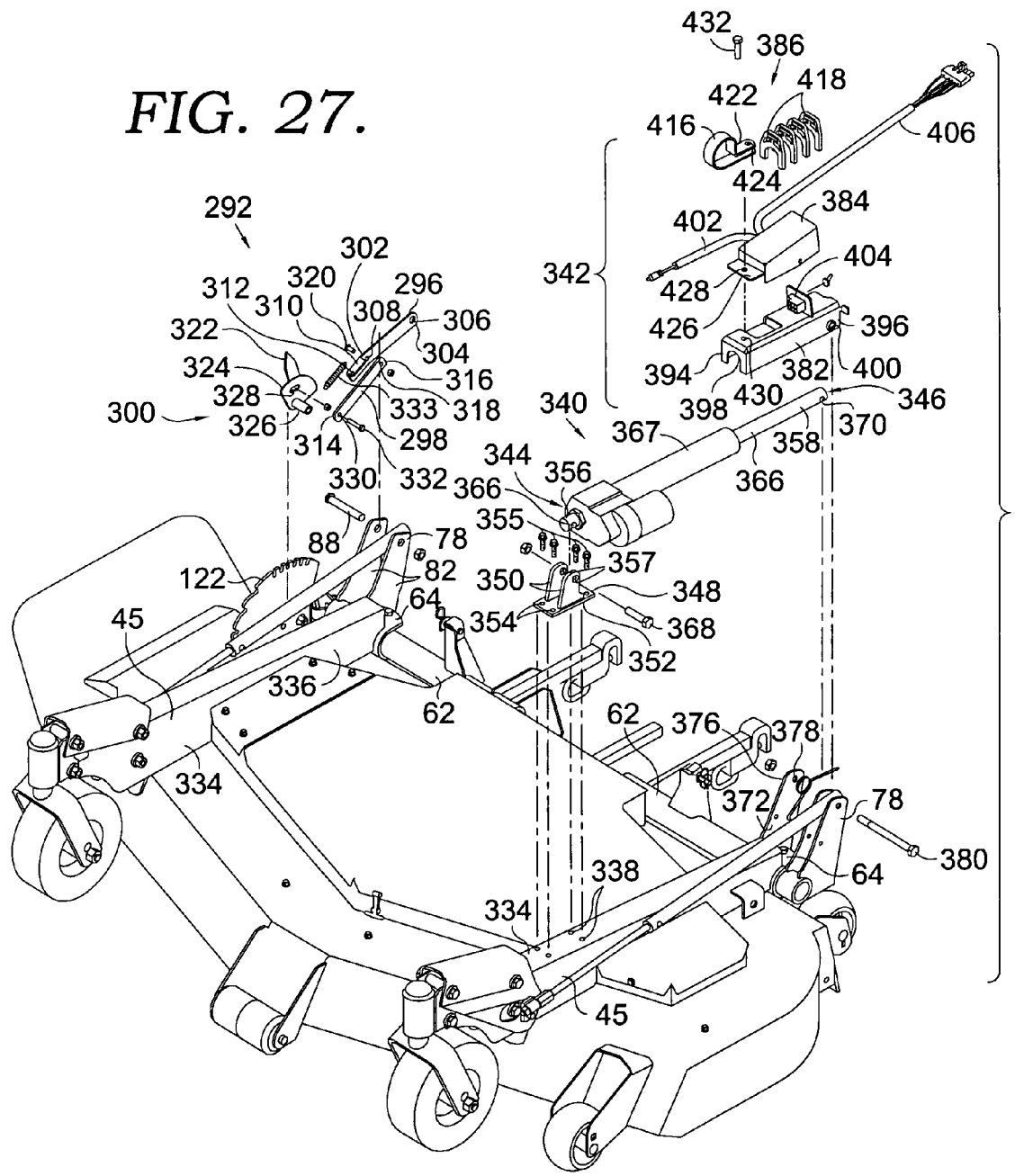

Referring now to FIGS. 23 and 27, the indicator linkage 292 generally includes an upper link 296, a lower link 298, and a height indicator 300. The upper link 296 has a distal end 302 and a proximal end 304. The proximal end 304 has an aperture 306 which receives the bolt 88 to pivotally couple the upper link 296 between the support plates 82 of the actuating member 78 on the discharge side 128 of the mower deck 10. The distal end 302 contains an aperture 308 and a flange 310 with an aperture 312, the flange 310 extending inwardly and generally perpendicularly to an inner surface of the upper link 296 adjacent the distal end 302.

The lower link 298 has a proximal end 314 and a distal end 316. The distal end 316 contains an aperture 318 that receives a bolt 320 passing through the distal end 302 of the upper link 296 to couple the upper link 296 to the lower link 298. The height indicator 300 includes a pointer 322, an arcuate member 324, and a cylindrical tube 326. The arcuate member 324 is semi-circular in nature with an arcuate slot 328 contained therein. The cylindrical tube 326 is coupled to the arcuate member 324 at its lower portion. The pointer 322 is coupled to the arcuate member 324 and extends upwardly therefrom. The height indicator 300 is pivotally coupled to the mowing height control plate 122 by receiving the bolt 142 through the aperture 144 and the cylindrical tube 326. The proximal end 314 of lower link contains an aperture 330 that receives a bolt 332 to couple the lower link 298 to the arcuate slot 328 of the height indicator 300. Referring again to FIGS. 23 and 27, the indicator linkage 292 also contains a spring 333. The spring 333 is coupled to aperture 312 at its first end and to bolt 332 at its second end to bias the upper link 296 downwardly.

As stated above, the towers 45 have been modified such that they extend rearwardly to the rear 48 of the deck 10. As best shown in FIG. 23, the tower contains a forward portion 334 and an aft portion 336. The aft portion 336 is welded to U-shaped receiving member 64. As shown in FIG. 27, the forward portion 334 of at least one of the towers 45 contains a number of apertures 338, the importance of which will be discussed below.

Figure 24:
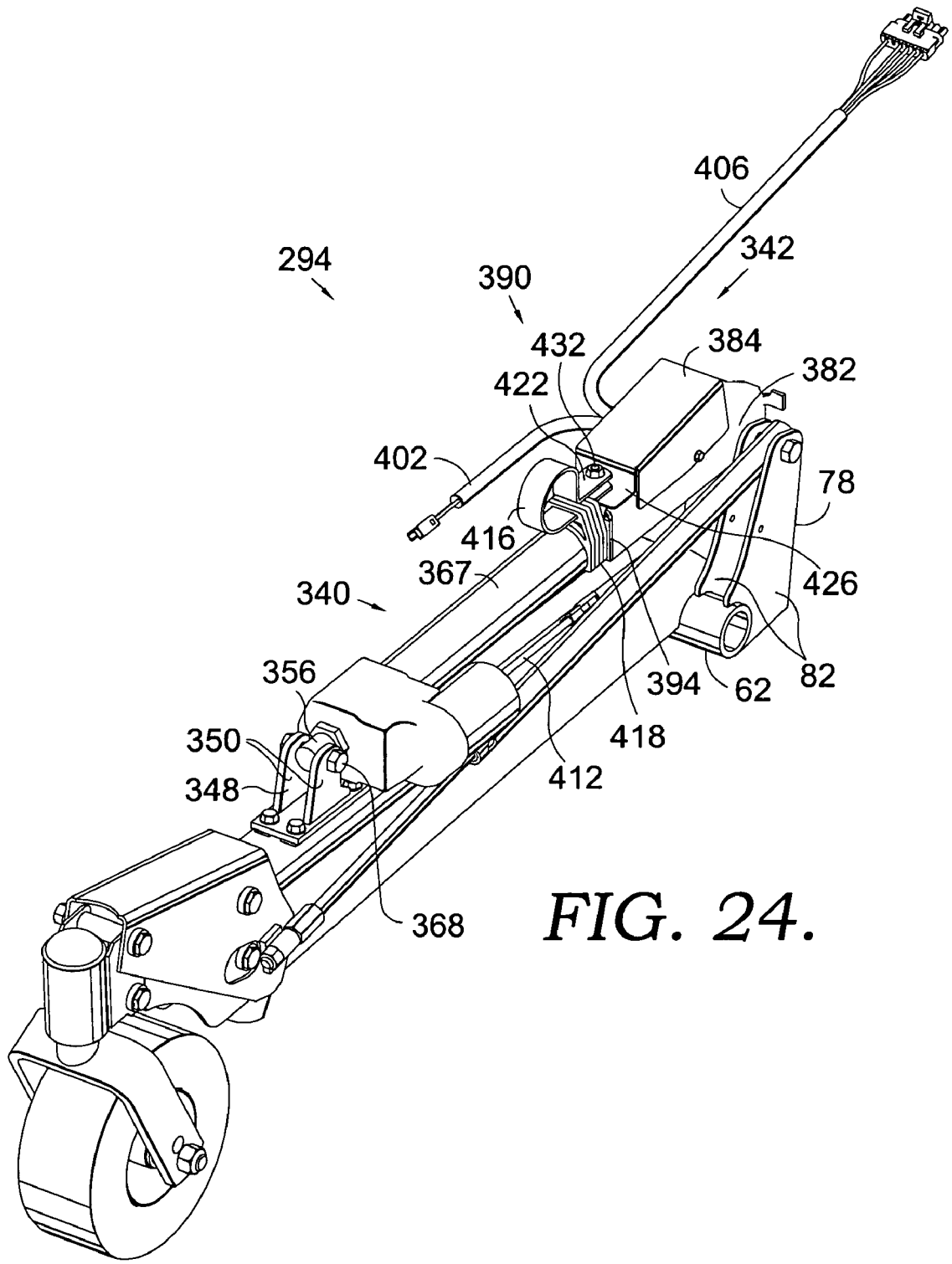
Figure 25:
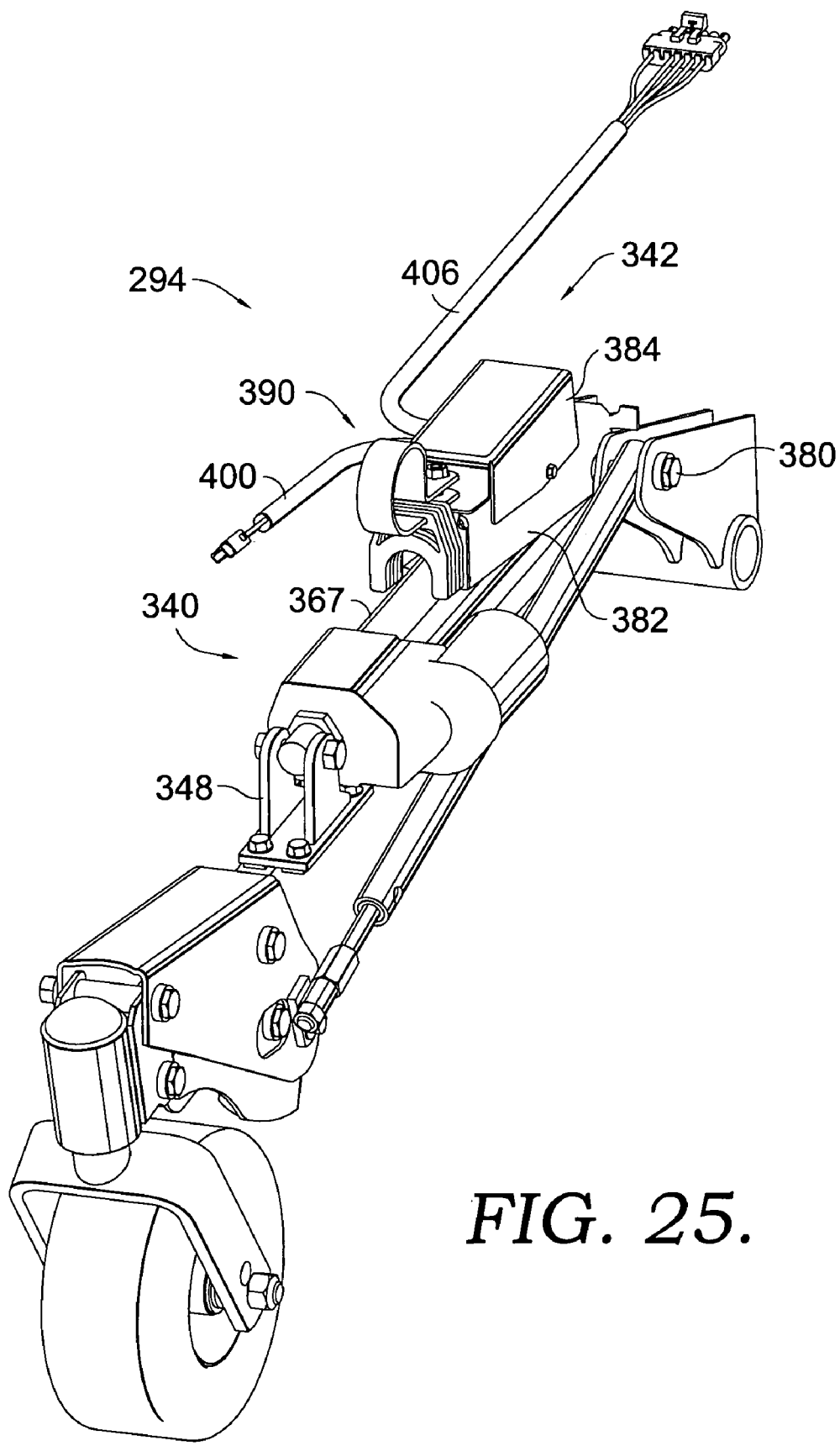

Referring now to FIGS. 24 and 25, the electronic height adjustment assembly 294 is shown. FIG. 24 shows the electronic height adjustment assembly 294 when the deck 10 in the use position while FIG. 25 shows the electronic height adjustment assembly 294 when the deck 10 in the servicing or storage position. The electronic height adjustment assembly 294 broadly includes an electric actuator 340 and a switch mount 342. Referring now to FIG. 27, the electric actuator 340 includes a proximal end 344 and a distal end 346. The proximal end 344 is coupled to the forward portion 334 of the tower 45 via a bracket 348. The bracket 348 includes a pair of upstanding plates 350 and a base plate 352 with a plurality of apertures 354. The apertures 354 are generally aligned with the apertures 338 located on the forward portion 334 of the tower 45 and serve to mount the bracket 348 to the tower 45 via bolts 355. The upstanding plates 350 are perpendicular to the base plate 352 and extend upwardly therefrom. The upstanding plates 350 are spaced apart from one another in a generally parallel relationship. The upper portions of the upstanding plates 350 each contain an aperture 357.

Figure 28:
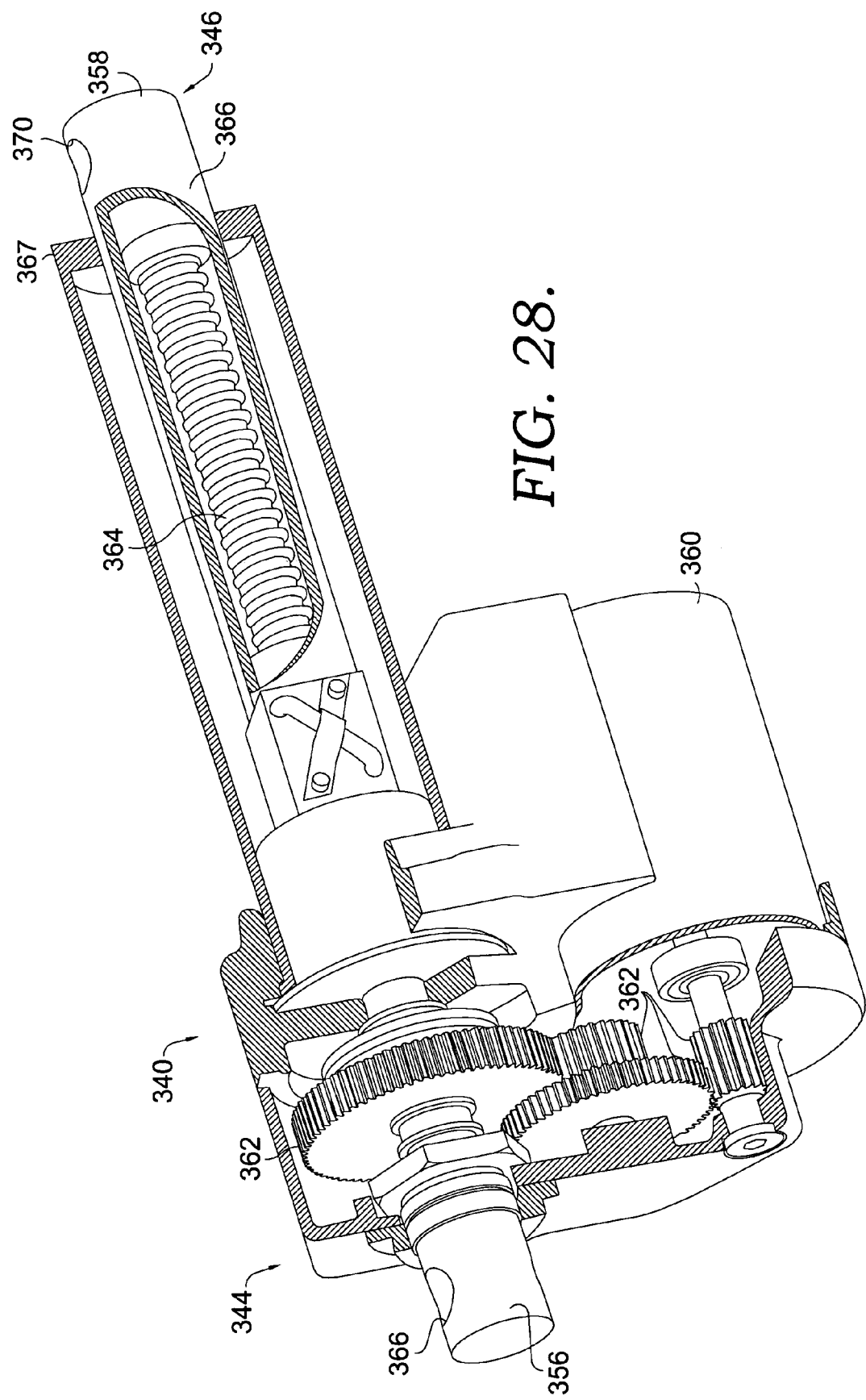

Referring now to FIG. 28, the electric actuator 340 further includes a front mount 356, a rear mount 358, a motor 360, a series of gears 362, a threaded rod 364, a carriage sleeve 366, and an actuator barrel 367. It will be appreciated by one of ordinary skill in the art that the electric actuator 340 is a mechanism that translates rotational motion from the motor 360 to linear movement of the carriage sleeve 366 through the series of gears 362 and the threaded rod 364. The carriage sleeve 366 moves in a telescoping fashion with respect to the actuator barrel 367 to both adjust the height of the deck 10 and to rotate the deck 10 from the use position to the servicing/storage position as will be discussed in more detail below.

Referring now to FIGS. 24, 27, and 28, the front mount 356 is located at the proximal end 344 and contains an aperture 366. The front mount 356 is coupled to the upstanding plates 350 by receiving a pin 368 through the apertures 366 and 357. The rear mount 358 is located at the distal end 346 and contains an aperture 370.

Turning to FIGS. 20, 21, and 27, the pair of actuating members 78 have both been moved outwardly on lift shaft 62 to a location adjacent U-shaped receiving members 64. As stated previously, each actuating member 78 includes a pair of upstanding support plates 82 spaced apart from one another in a generally parallel relationship. As best shown in FIGS. 20 and 27, an additional support plate 372 has been added and is coupled at its proximal end 374 to the lift shaft

62. The additional support plate 372 and the inner support plate 82 are connected to the lift shaft 62 in a spaced apart relationship in such a manner that they are on opposite sides of the U-shaped receiving member 64 when the lift shaft 62 is coupled to the deck. As seen in FIG. 27, a distal end 376 of the support plate 372 has a bore 378 therethrough for receiving a bolt 380.

Referring now to FIGS. 24-27, the switch mount 342 is shown. The switch mount 342 broadly includes a housing 382, a shield 384, a spacer assembly 386, a wiring assembly 390 and a manual switch 392. As best seen in FIG. 27, the housing 382 includes a forward portion 394 and an aft portion 396 with a U-shaped channel 398 extending therebetween. The aft portion 396 has a horizontal passage 400 that is aligned with the aperture 370 and the bore 378 and receives the bolt 380 to couple the rear mount 358 and the housing 382 between the actuating member 78 and the support plate 372. It will be appreciated when viewing FIGS. 24 and 27, that U-shaped channel 398 lowers the carriage sleeve 366 when the mower 10 is in the use position.

Figure 26:
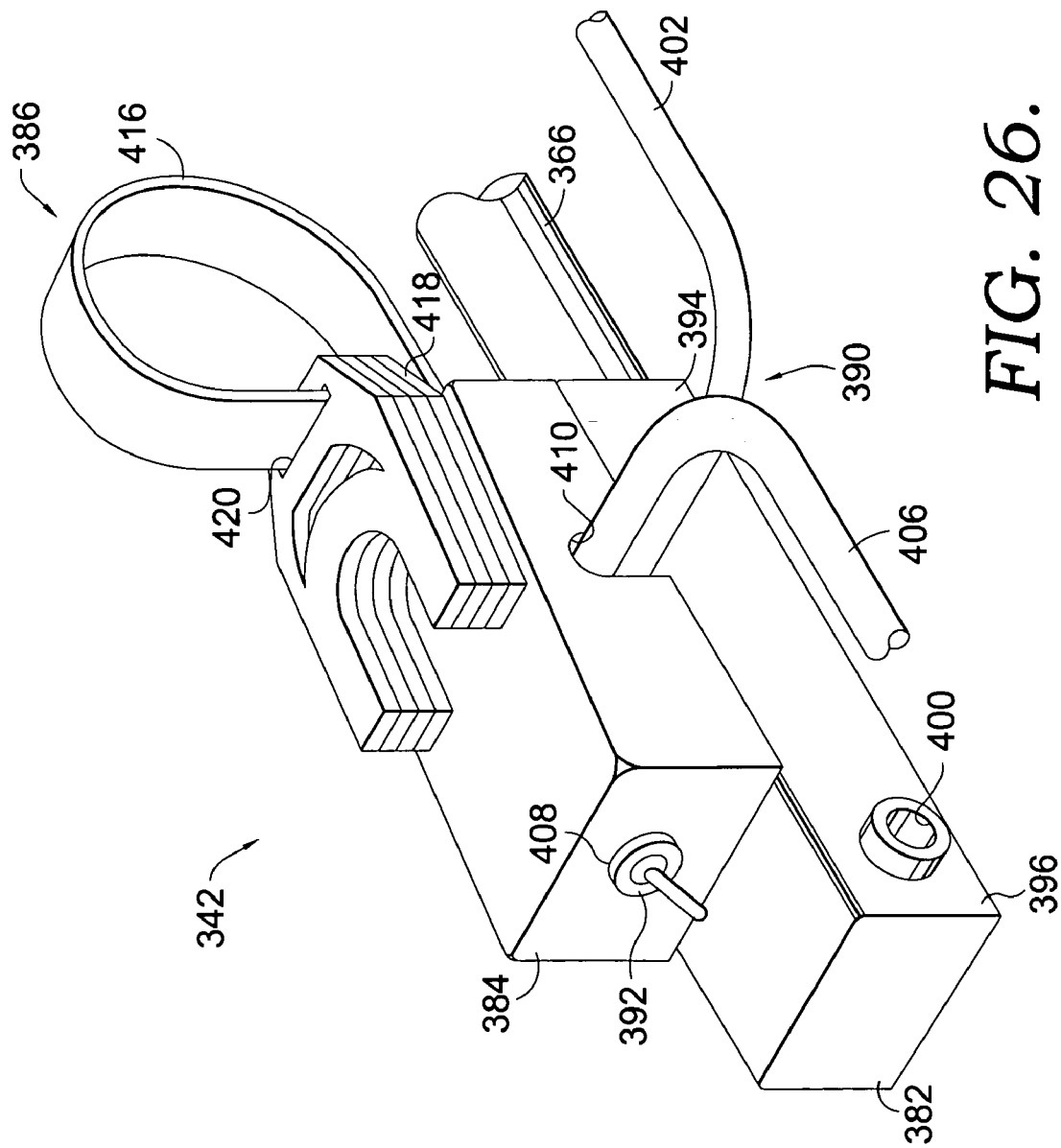

Referring now to FIGS. 26 and 27, the wiring assembly 390 includes an actuator connector 402, a toggle switch 404, and a wiring harness connector 406. The toggle switch 404 is coupled to the housing 382 and covered by the shield 384. The manual switch 392 is coupled to the toggle switch 402 and extends outwardly through an aperture 408 in the shield 384. The actuator connector 402 is coupled at one end to the toggle switch 404 and extends outwardly through an aperture 410 in the shield 384. Referring now to FIG. 24, opposite the connection to the toggle switch 404, the actuator connector 402 is coupled to a connector 412 located on the motor 360. The wiring harness connector 406 is coupled at one end to the toggle switch 404. As best shown in FIG. 21, opposite the connection to the toggle switch 404, the wiring harness connector 406 is coupled to a switch 414 located near the seat 290.

As stated above, the switch mount 342 further includes a spacer assembly 386. The spacer assembly 386 includes a spacer mount 416 and a plurality of spacers 418. The spacers 418 are U-shaped with a slot 420 contained therein. Referring now to FIGS. 24 and 27, the spacer mount 416 is a generally circular ring with a flanged portion 422 and is adapted to receive the spacers 418. The flanged portion 422 includes a vertical passage 424. The shield 384 further contains a front flange 426 with an aperture 428. The aperture 428 is aligned with an aperture 430 located in the forward portion 394 of the housing 382. The apertures 428, 430 and the vertical passage 424 receive a bolt 432 to couple the spacer mount 416 and the shield 384 to the housing 382.

Referring now to FIG. 21, the mower deck 10 is shown in the use position. The electric actuator 340 is in the extended position, and the switch mount 342 is in a down position, covering the carriage sleeve 366 of the electric actuator 340. When the switch mount 342 is in the down position it serves as a stop for the electric actuator 340, which sets the deck height, as will be discussed in more detail below.

To change the cutting height of the mower deck 10, the user would, while seated in the seat 290, manipulate the switch 414 to move the mower deck 10 to the desired height. As appreciated by one of ordinary skill in the art, manipulation of the switch 414 activates the motor 360 and causes the gears 362 to rotate. As best seen in FIG. 28, the rotation of the gears 362 translates into a rotational motion of the threaded rod 364. The rotational motion of the threaded rod 364 is translated into linear movement of the carriage sleeve 366 and, thus, movement of the rear mount 358 toward and away from the actuator barrel 367. The linear movement of the carriage sleeve 366, in turn, causes the electric actuator 340 to lengthen or shorten, thereby moving the height of the deck 10 down or up respectively. The height of the deck 10 can be manually set by the switch 414 with the aid of the spacers 418.

Referring now to FIGS. 24 and 27, the spacers 418 are used to set specific cut heights by allowing the setting of a specific predetermined distance between the forward portion 394 of the actuator housing 382 and a rear portion of the actuator barrel 367. The spacers 418 may be placed individually between the forward portion 394 of the actuator housing 382 and a rearward portion of the actuator barrel 367, as shown in FIG. 24, or may be rotated upwardly out of the way to rest on the shield 384, as shown in FIG. 26. The spacers 418 also allow the user to raise the deck 10 for obstacles and then return the deck 10 exactly to the previous height.

Figure 22:
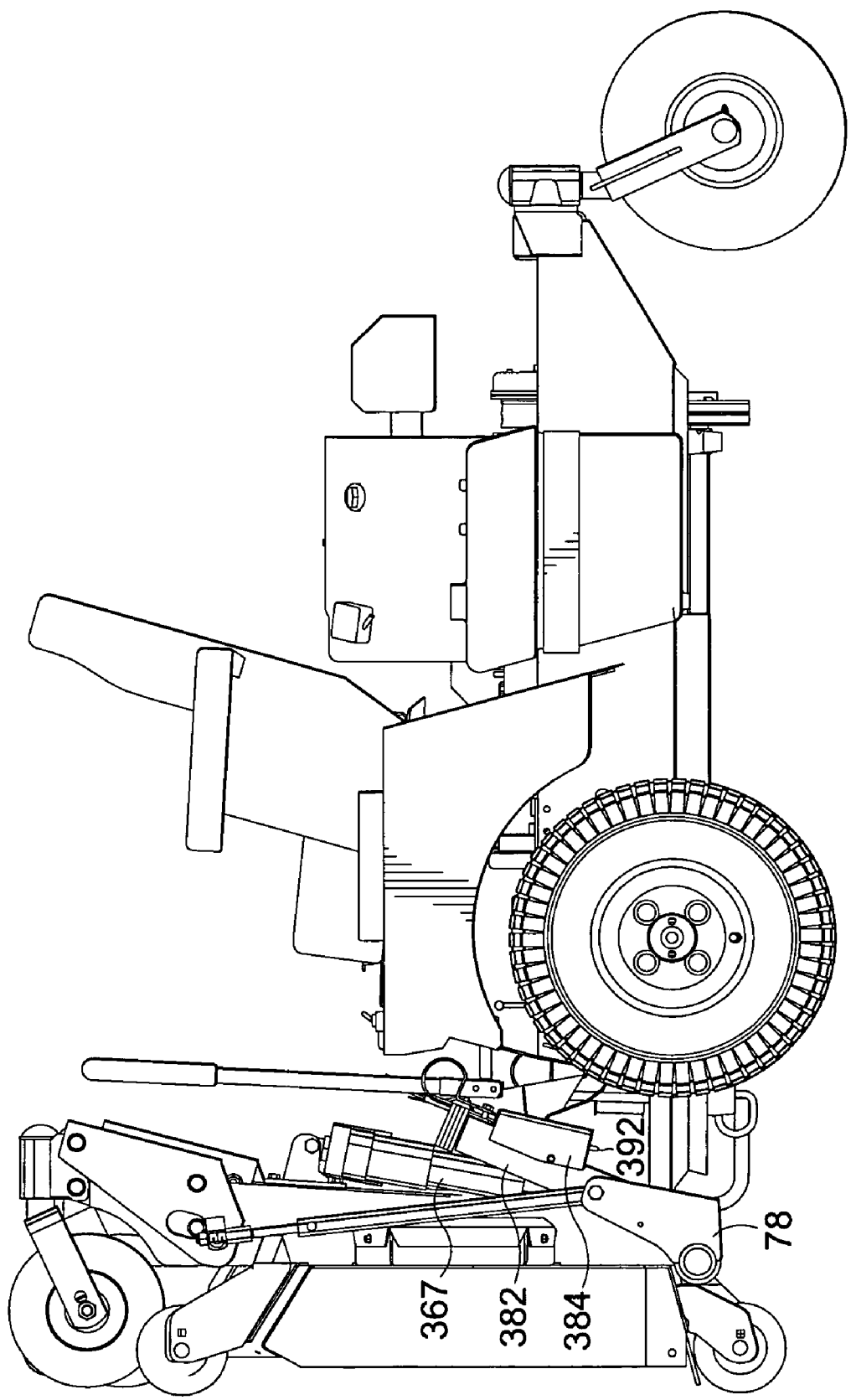

To move the deck from the use position illustrated in FIGS. 20 and 21 to the storage/servicing position illustrated in FIG. 22, the user pulls upwardly on the spacer mount 416 to move the switch mount 342 into a lift position. As shown in FIG. 25, once the switch mount 342 is raised, the electric actuator 340 retracts and the switch mount 342 rests upon the actuator barrel 367. The user then manipulates the switch 392 located on the back of the switch mount 342, as illustrated in FIG. 26. The manipulation of the switch 392 activates the motor 360 and causes the gears 362 to rotate thereby causing the electric actuator 340 to contract and raise the mower deck 10 to the storage/servicing position.

To return the mower deck 10 to the use position, the user manipulates the switch 392 on the back of the switch mount. As stated above, manipulation of the switch 392 activates the motor 360 and causes the gears 362 to rotate thereby causing the electric actuator 340 to expand and return the mower deck 10 to the use position. Once the electric actuator 340 is fully extended the switch mount 342 is moved back to the down position, as shown in FIGS. 21 and 24. The height of the mower deck 10 may then be adjusted by the switch 414, illustrated in FIG. 21. While switch 414 activates the motor 360 in the same manner as switch 392, switch 414 is preferably only used to control the mowing height and is preferably not used to rotate the deck to and from the storage/servicing position.

Many variations can be made to the illustrated embodiment of the present invention without departing from the scope of the present invention. Such modifications are within the scope of the present invention. For example, in an alternate embodiment, the front wheel control arms 40 can be replaced by cables or the like. Such an arrangement would permit the front of the deck to be raised to the upright storage position but still allow the user to adjust the height of the mower deck by pulling on the cables by way of rotating the lift shaft 62. Other modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. A mechanism for moving a mower deck from a generally horizontal use position to a generally vertical storage/servicing position, the mechanism comprising:
    a moving member having first and second ends, the first end coupled with a forward portion of the mower deck and the second end coupled with a rear portion of the mower deck; and
    a switch assembly mechanically and electrically coupled with the moving member, wherein the switch assembly is movable between a first position and a second position, wherein the first position is a generally horizontal engaged position, wherein the second position is a generally non-horizontal disengaged position;
    wherein movement of the deck from the use position to the storage/servicing position is prevented when the switch assembly is in a first position and wherein movement of the deck from the use position to the storage/servicing position is permitted when the switch assembly is the second position, and wherein the movement of the deck occurs generally about the rear portion of the mower deck;
    wherein the moving member is an actuator and wherein the actuator includes:
        a motor;
        a series of gears coupled with the motor;
        a threaded rod coupled to the series of gears; and
        a carriage coupled to the threaded rod;
        wherein rotational motion of the motor is translated into rotational movement of the threaded rod via the series of gears thereby causing linear movement of the carriage along the threaded rod which in turn moves the deck from the use position to the storage/servicing position.

2. A mechanism for moving a mower deck from a generally horizontal use position to a generally vertical storage/servicing position, the mechanism comprising:
    a moving member having first and second ends, the first end coupled with a forward portion of the mower deck and the second end coupled with a rear portion of the mower deck; and
    a switch assembly mechanically and electrically coupled with the moving member, wherein the switch assembly is movable between a first position and a second position;
    wherein movement of the deck from the use position to the storage/servicing position is prevented when the switch assembly is in a first position and wherein movement of the deck from the use position to the storage/servicing position is permitted when the switch assembly is the second position, and wherein the movement of the deck occurs generally about the rear portion of the mower deck; and
    a height adjustment mechanism coupled to the switch assembly, wherein the height adjustment mechanism includes an adjustment lever, wherein movement of the adjustment lever allows the height of the deck to be adjusted when the switch assembly is in the first position, wherein the height adjustment mechanism further includes a spacer assembly, the spacer assembly including an attachment mechanism and at least one spacer, wherein the at least one spacer cooperates with the actuator and the switch assembly to permit a fixed height adjustment.

3. The mechanism of claim 2, wherein the at least one spacer is coupled with the attachment mechanism.

4. The mechanism of claim 3, wherein the spacer assembly further includes a plurality of spacers.

5. A mechanism for moving a mower deck from a generally horizontal use position to a generally vertical storage/servicing position, the mechanism comprising:
    a moving member having first and second ends, the first end coupled with a forward portion of the mower deck and the second end coupled with a rear portion of the mower deck; and
    a switch assembly mechanically and electrically coupled with the moving member, wherein the switch assembly is movable between a first position and a second position;
    wherein movement of the deck from the use position to the storage/servicing position is prevented when the switch assembly is in a first position and wherein movement of the deck from the use position to the storage/servicing position is permitted when the switch assembly is the second position, and wherein the movement of the deck occurs generally about the rear portion of the mower deck; and
    a height indicator linkage coupled to the mower deck, wherein the height indicator linkage includes a linkage mechanism and a indicator mechanism, the linkage mechanism having first and second ends, the first end coupled with the indicator mechanism and to an intermediate portion of the mower deck and the second end coupled with a rear portion of the mower deck.

6. The mechanism of claim 5, wherein the moving member alters in length upon movement of the mower deck from the generally horizontal use position to the generally vertical storage/servicing position.

7. A mechanism for moving a mower deck from a generally horizontal use position to a generally vertical storage/servicing position, the mechanism comprising:
    an actuator having first and second ends, the first end coupled with a forward portion of the mower deck and the second end coupled with a rear portion of the mower deck, the actuator comprising:
        a motor;
        a series of gears coupled with the motor;
        a threaded rod coupled to the series of gears; and
        a carriage coupled to the threaded rod;
        wherein rotational motion of the motor is translated into rotational movement of the threaded rod via the series of gears thereby causing linear movement of the carriage along the threaded rod, which in turn moves the deck generally about the rear portion of the deck from the use position to the storage/servicing position; and
    a switch assembly mechanically and electrically coupled with the actuator, wherein the switch assembly is movable between a first position and a second position;
    wherein movement of the deck from the use position to the storage/servicing position is prevented when the switch assembly is engaged in the generally horizontal position and wherein movement of the deck from the use position to the storage/servicing position is permitted when the switch assembly is disengaged in the generally non-horizontal position.

8. A mechanism for moving a mower deck from a generally horizontal use position to a generally vertical storage/servicing position, the mechanism comprising:

a moving member having first and second ends, the first end coupled with a forward portion of the mower deck and the second end coupled with a rear portion of the mower deck;

a switch assembly mechanically and electrically coupled with the moving member, wherein the switch assembly is movable between a first position and a second position; and a height adjustment mechanism coupled to the switch assembly, the height adjustment mechanism comprising an adjustment lever and a spacer assembly, wherein movement of the adjustment lever allows the height of the deck to be adjusted when the switch assembly is in the first position, the spacer assembly includes an attachment mechanism and at least one spacer, wherein the at least one spacer cooperates with the actuator and the switch assembly to permit a fixed height adjustment;

wherein movement of the deck from the use position to the storage/servicing position is prevented when the switch assembly is in a first position and wherein movement of the deck from the use position to the storage/servicing position is permitted when the switch assembly is the second position, with the movement occurring generally about the rear portion of the mower deck.

* * * * *